United States Patent [19]

Morganti et al.

[11] Patent Number: 4,866,599
[45] Date of Patent: Sep. 12, 1989

[54] CALL INSTRUCTION, RETURN INSTRUCTION AND TRAP PROCEDURE FOR RING CROSSING ARCHITECTURE

[75] Inventors: Victor M. Morganti, Lincoln; Patrick E. Prange, Brookline, both of Mass.

[73] Assignee: Bull HN Information Systems Inc., Billerica, Mass.

[21] Appl. No.: 944,494

[22] Filed: Dec. 19, 1986

Related U.S. Application Data

[63] Continuation-in-part of Ser. No. 749,245, Jun. 27, 1985, Pat. No. 4,703,417.

[51] Int. Cl.[4] .................... G06F 12/00; G06F 12/02; G06F 12/08; G06F 12/14
[52] U.S. Cl. .................. 364/200; 364/256.3; 364/228.2; 364/230; 364/230.1; 364/230.4; 364/232.1
[58] Field of Search ... 364/200 MS File, 900 MS File, 364/300

[56] References Cited

U.S. PATENT DOCUMENTS

| | | | |
|---|---|---|---|
| 3,916,385 | 10/1975 | Parmar et al. | 364/200 |
| 4,104,718 | 8/1978 | Poublan et al. | 364/200 |
| 4,177,510 | 12/1979 | Appell et al. | 364/200 |
| 4,297,743 | 10/1981 | Appell et al. | 364/200 |
| 4,524,416 | 6/1985 | Stanley et al. | 364/200 |

*Primary Examiner*—Archie E. Williams, Jr.
*Assistant Examiner*—Robert B. Harrell
*Attorney, Agent, or Firm*—William W. Holloway; Faith F. Driscoll; John S. Solakian

[57] ABSTRACT

In combination with a multiprocessing and multiprogramming computer system having a ring protection mechanism for protecting computer programs from unauthorized access, a new architecture for the execution of the call instruction, the return instruction, and the trap procedure is implemented partly in firmware and partly in hardware. The architecture includes a new stack mechanism for storing hardware managed control information in a control frame and software controlled data in a data frame.

5 Claims, 19 Drawing Sheets

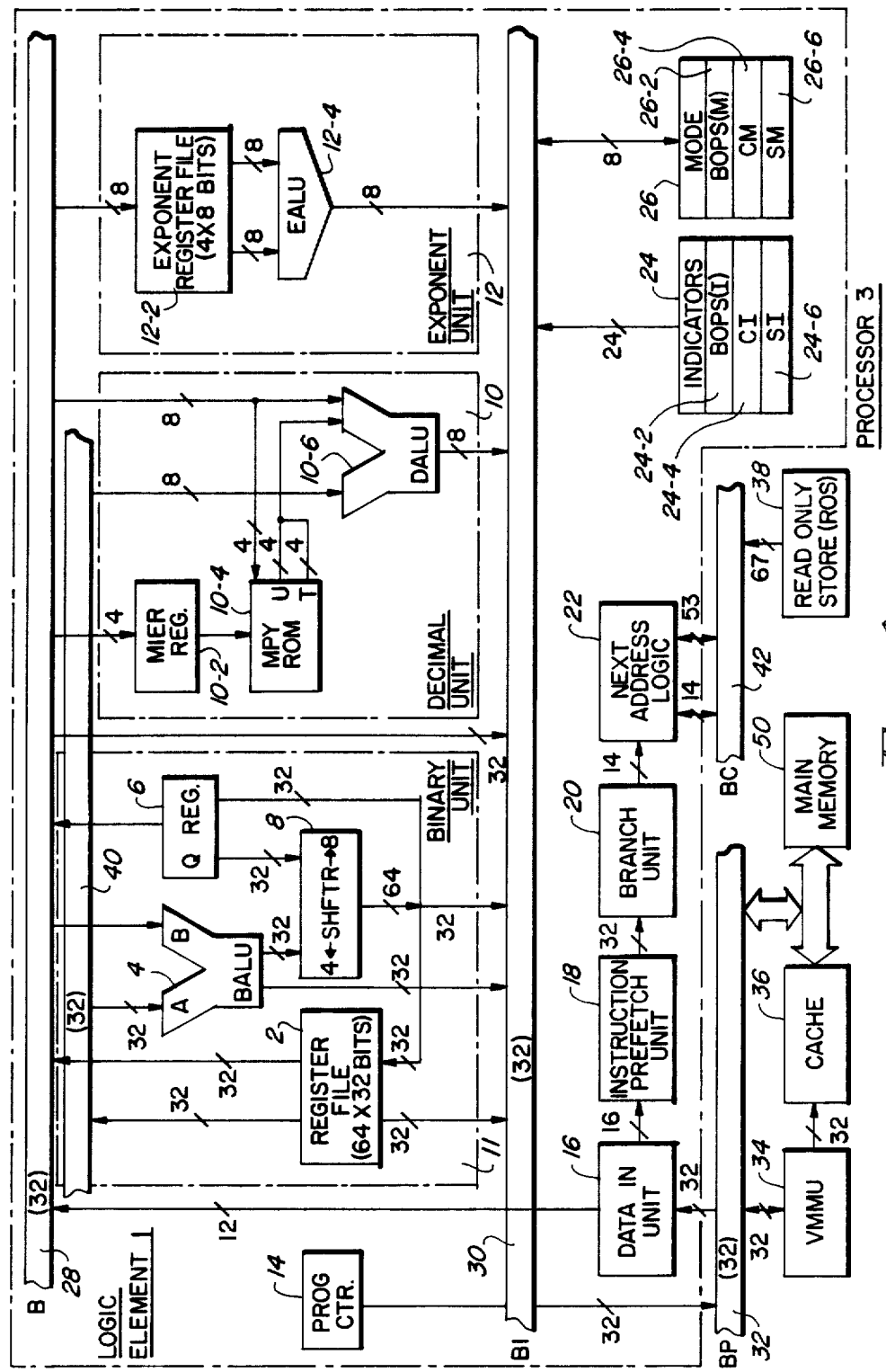

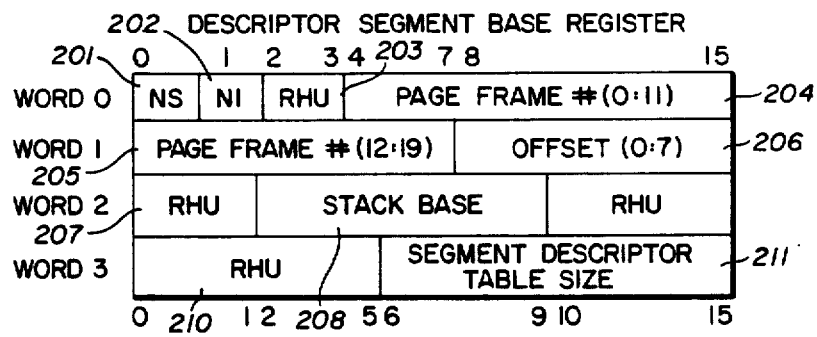
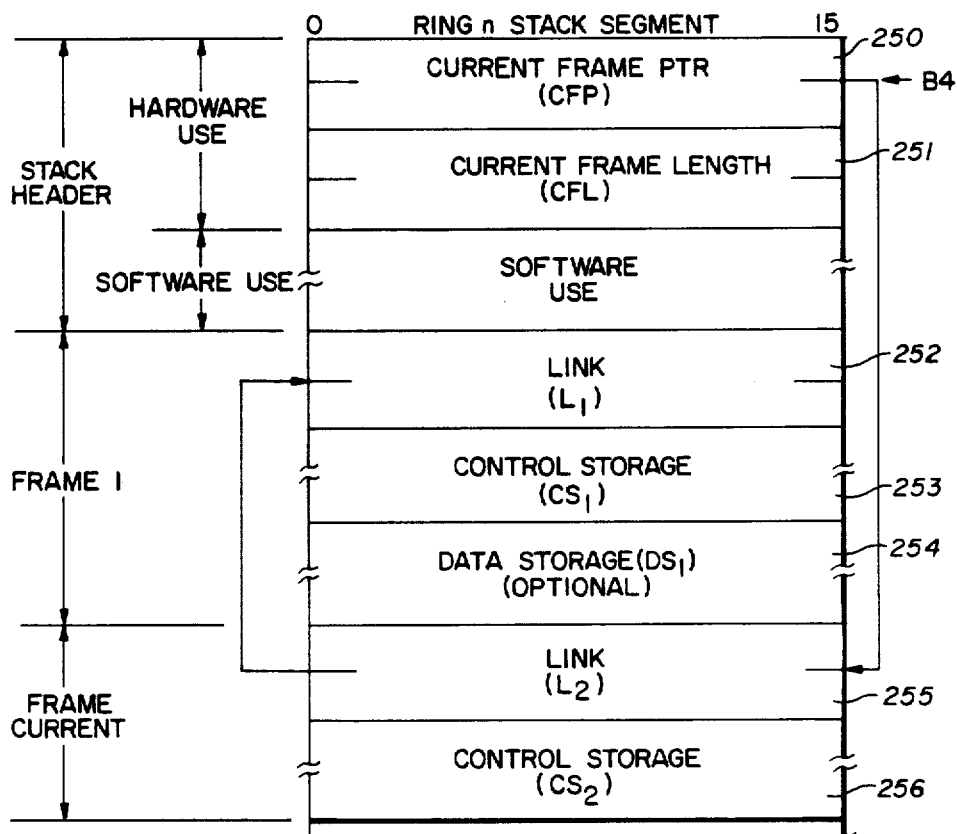
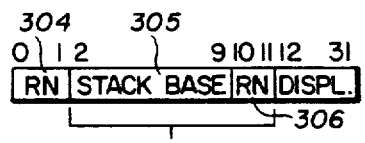
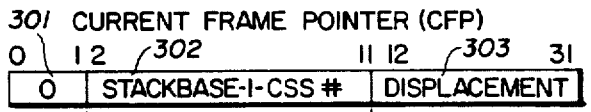
FIG. 3B    FIG. 3A

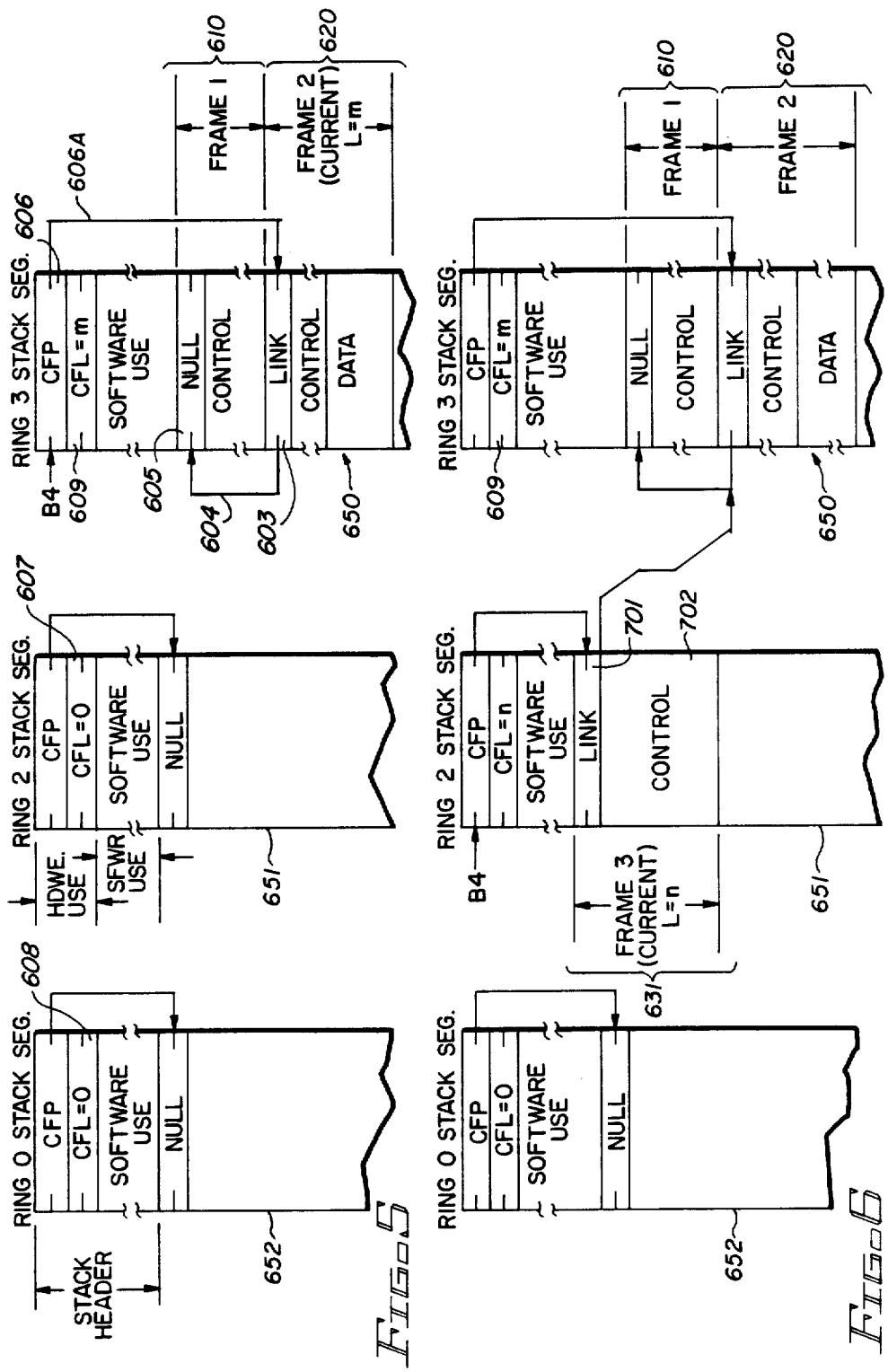

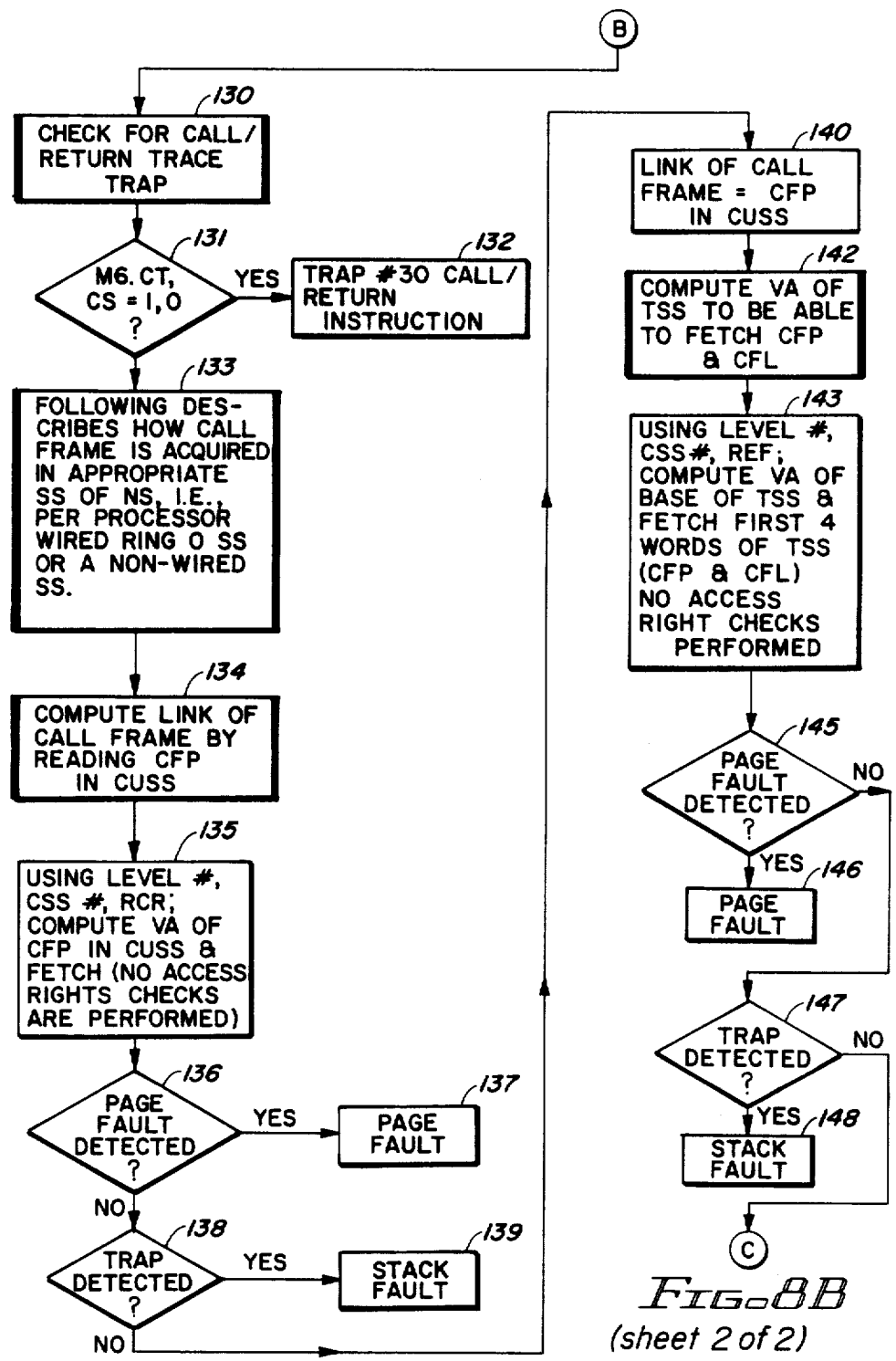
FIG. 8B (sheet 2 of 2)

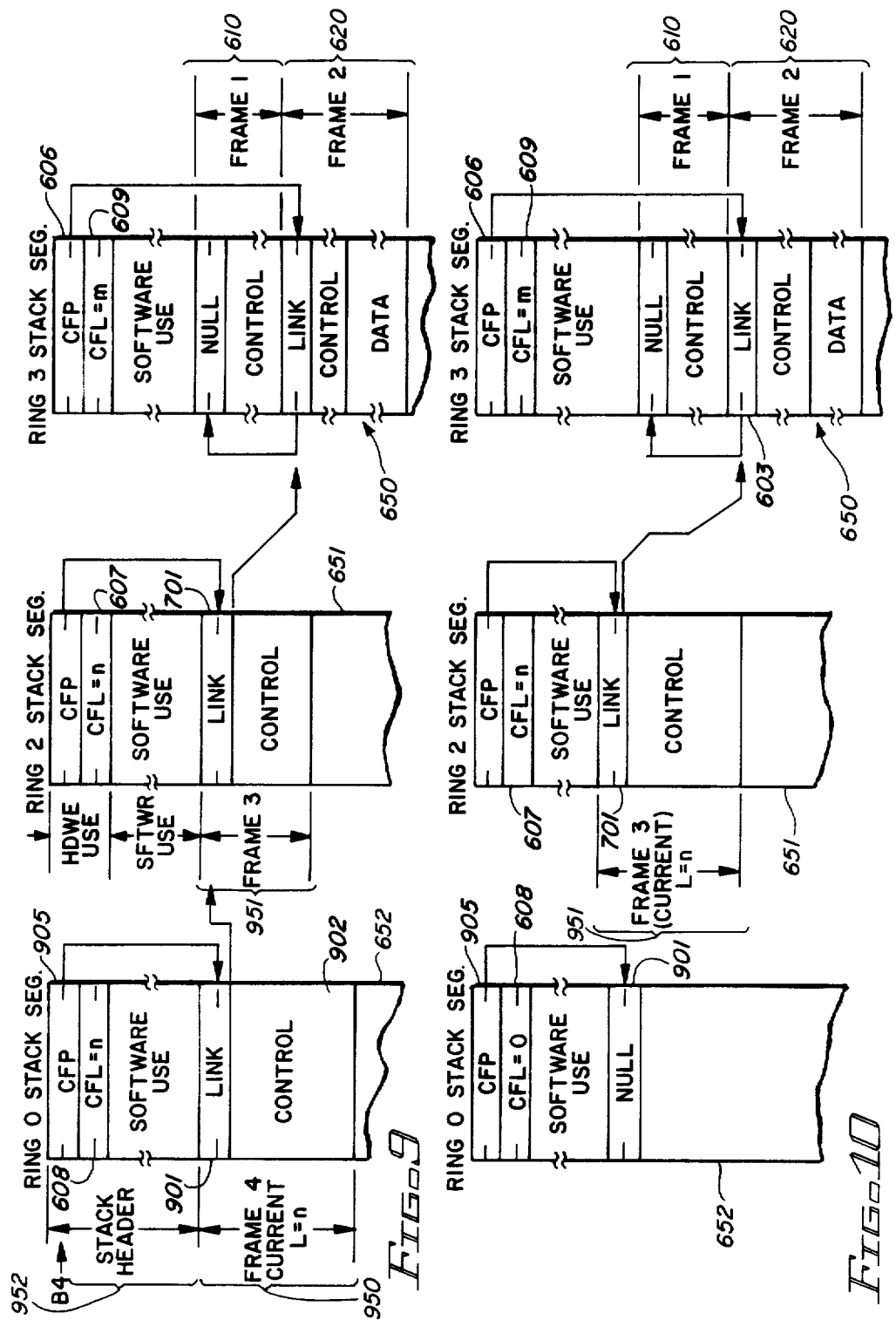

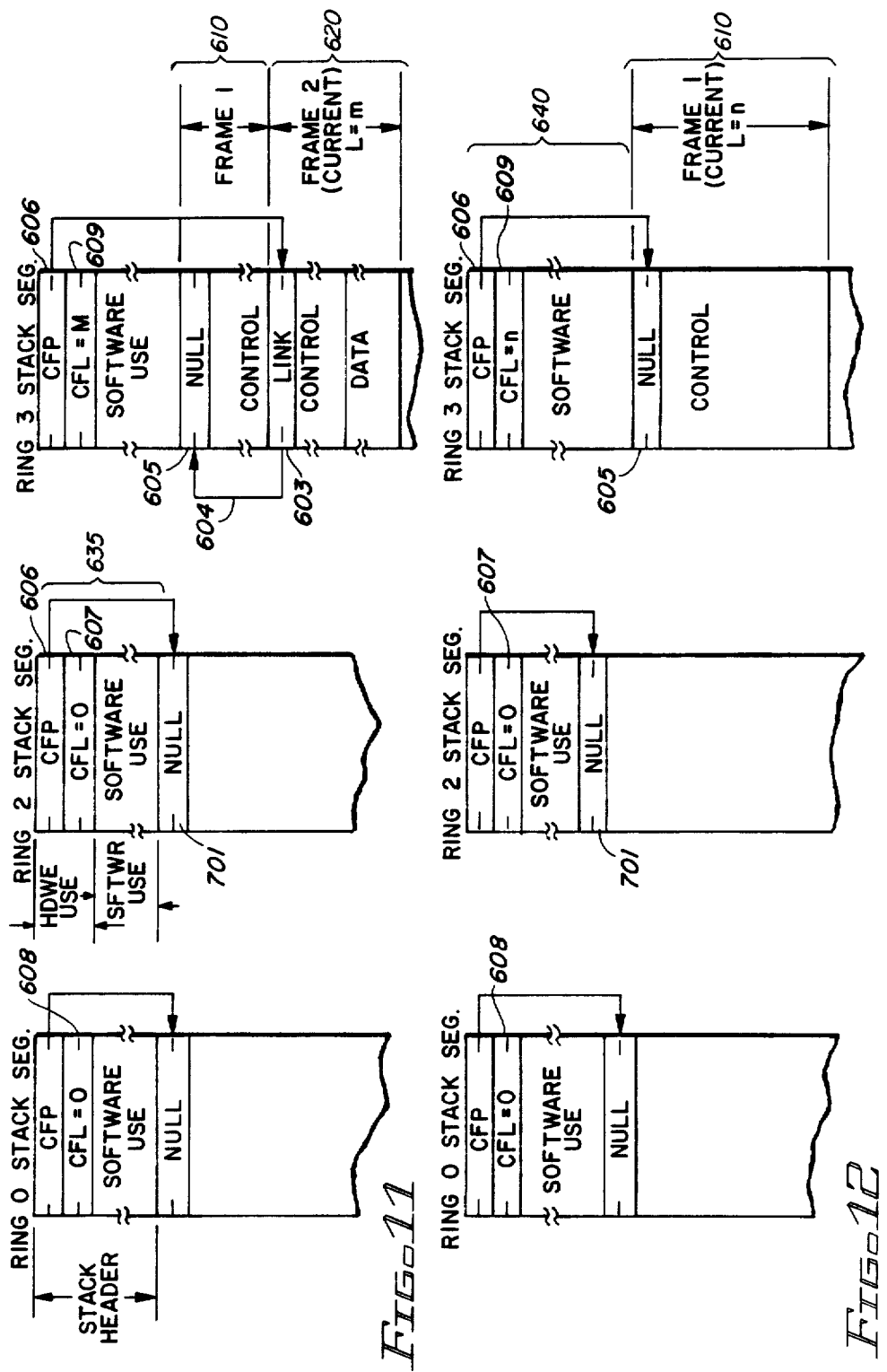

STACK FRAME FORMAT FOR ALL TRAPS (sheet 1 of 2)

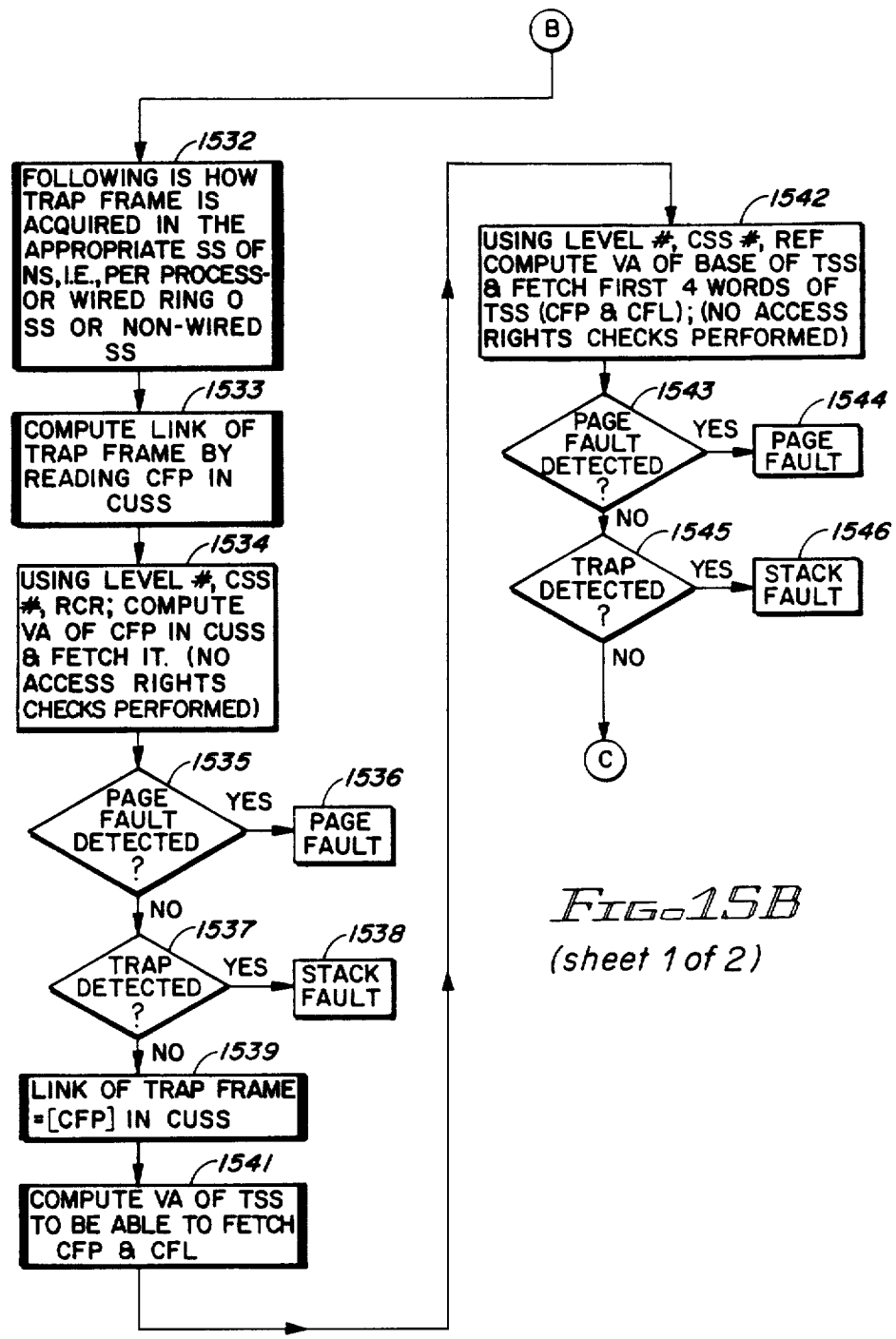
FIG. 15B (sheet 1 of 2)

CALL INSTRUCTION, RETURN INSTRUCTION AND TRAP PROCEDURE FOR RING CROSSING ARCHITECTURE

This is a continuation-in-part of co-pending application Ser. No. 06/749,245, filed on June 27, 1985, now U.S. Pat. No. 4,703,417, issued on Oct. 27, 1987.

CROSS-REFERENCES TO RELATED APPLICATIONS

The following United States patent applications and/or patents are related documents to the instant application:

1. Multiprocessor on a Single Semiconductor Chip by Thomas F. Joyce, Richard P. Kelly, Jian-Kus Shen and Michelm Raquin, having U.S. Ser. No. 722,237 and filed on Apr. 11, 1985.

2. Ring Checking Hardware by Pravinsinh L. Palmer, Richard P. Wilder, Ming H. Louie, and Benjamin S. Franklin, having U.S. Pat. No. 3,916,385, issued Oct. 28, 1975.

3. Protection of Data in an Information Multiprocessing System by Implementing a Concept of Rings to Represent the Different Levels of Privileges Among Processors by Marc Appell, George Lepicard, Phillippe Shubert de Rivet, John J. Bradley, and Benjamin S. Franklin, having U.S. Pat. No. 4,177,510, issued Dec. 4, 1979.

4. Call and Stack Mechanism for Procedures Executing in Different Rings by Marc Appell, Jean Louis Bogaert, Claude Massuard, John bradley and Benjamin S. Franklin, having U.S. Pat. No. 4,297,743.

5. P and V Instructions for Semaphore Architecture In a Multiporgamming/Multiprocessing Environment, invented by Prange et al, assigned to the same assignee named herein, issued as U.S. Pat. No. 4,725,946 on Feb. 16, 1988.

BACKGROUND OF THE INVENTION

1. Field of the Invention

This invention relates generally to data processing systems and, more particularly, to a method and apparatus for protecting information.

2. Description of the Related Art

Computer systems have grown from the simple batched systems, wherein the valuable resource of random access memory was allocated to a single program, to the present-day multiprogramming and multiprocessing systems wherein information is shared among a community of users. In this type of shared environment, protection of shared information is required not only to maintain user security and privacy and restrict access of information to those users entitled to it, but to guarantee system integrity and reliability by limiting the propagation of errors through intenetional or unintentional altering of shared information. Several schemes have been utilized in the past in order to protect information. Some of them are detailed by Robert M. Graham in a paper entitled "Protection in an Information Processing Utility", published in CACM (May 1968).

Key to the protection of information has been the restriction of access to procedures that can execute on a processor to those entities having the right to use those procedures. One such concept groups the sets of procedures into rings that can unambiguously be ordered by increasing the power or level of privilege. By assigning a collection of sets of procedures to a collection of concentric rings, and assigning numbers to each ring with the smallest ring having the smallest number, and each succeeding larger ring having a progressively greater number, different levels of privilege can be unambiguously assigned to the user of a segment of a computer system. Under this concept, the innermost ring having the smallest number assigned to it has the greatest privilege. Hence, users in the lowest ring number can access information having higher ring numbers, but users in the higher ring number cannot access information having lower ring numbers or can access information in the lower ring number only in a specified manner. The ring concept of information protection was used by the MULTICS operating system (Multiplexed Information and Computing Service) and was implemented in Honeywell's 635 and 645 computers. The MULTICS philosophy utilizes 64 rings of protection numbered as rings 0–63. The MULTICS system is described in Chapter 4 of a book entitled "The MULTICS System: An Examination of its Structure" by Elliott I. Organick, published by MIT Press, and also by the MULTICS System Programmer's Manual, 1969, MIT Project MAC. Briefly, the MULTICS system does not utilize a pure ring protection strategy, but rather employs the ring bracket protection strategy, wherein a user's access rights with respect to a given segment are encoded in access-mode and a triple ring number (R1, R2, R3), called the user's ring brackets for a given segment. For purposes of understanding the present invention, R1 designates the level of privilege required to write data into the associated segment. R2 designates the level of privilege required to read the data in the associated segment (the privilege range between and including R1 and R2 being generally referred to as the execute range). R3 designates the level of privilege required to access or call the associated segment. This protection technique can be implemented wholly in software.

Because the MULTICS and Honeywell's 645 version of ring protection was implemented principally in software, considerable operating system supervisor overhead was entailed when call procedures or trap procedures and the subsequent return procedures attempted to utilize a supervisor procedure. This operating system supervisor overhead made the system relatively slow. Accordingly, later versions implemented the ring protection concept in hardware. In one such system, data and procedure segments were grouped into a hierarchy of four rings or classes. The four rings of privilege levels are identified by entities 0–3, each ring representing a level of privilege in the system with level 0 having the most privilege and level 3 having the least. Level 0 is known as the innermost ring and level 3 is the outer ring. The basic notion is that a procedure belonging to an inner ring has free access to data in an outer ring. Conversely, a procedure in a outer ring cannot access data in an inner ring without incurring a protection violation exception. Transfer of control among procedures is monitored by a protection mechanism, such that a procedure executing in an outer ring cannot directly branch to a procedure in an inner ring. This type of control transfer is possible only by the execution of a special call instruction or trap handling procedure. To increase execution speed, the instruction is implemented mainly in hardware or firmware. In order to protect this instruction against misuse, certain conventions were set up. The hardware implementation has the disadvantage of inflexibility in calling or trap handling procedures.

Because the call instruction is designed to be wholly in firmware or hardware, the rules of the various procedures must be adhered to even though the system architecture evolves into a type not contemplated by the designer.

A need has therefore been felt for a call instruction, trap handling procedure, along with the associated return procedures, that have the flexibility of the MULTICS system to change algorithms just by changing the software programs, and the speed and efficiency of the hardware/firmware protection means that will meet the criteria of programming functional capability, economy and simplicity.

SUMMARY OF THE INVENTION

It is therefore an object of the present invention to provide an improved data processing system.

It is a feature of the present invention to provide an improved call instruction, trap handling procedure and return instruction for a ring protection mechanism.

It is another feature of the invention to provide an improved procedure call intruction, trap handling procedure and return instruction for ring protection hardware that is fast, yet flexible.

It is still a further feature of the invention to provide a call instruction, trap handling procedure and return instruction that is implemented partly in firmware and partly in software.

It is yet another feature of the invention to provide an improved stack mechanism for storing control information managed by the hardware, as well as data managed by the software.

These and other features of the invention will become apparent from the description of a preferred embodiment of the invention, when read in conjunction with the drawings contained herewith.

The foregoing and other features are obtained, according to the present invention, by providing a call instruction (for calling procedures), a trap procedure (for calling trap handling procedures) and a return instruction (for returning from a call procedure or trap handling procedure) in the ring protection architecture, that are implemented partly in firmware and partly in software. It also includes a new stack mechanism for storing hardware managed control information and software controlled data in a stack frame. Prior art devices required separate save areas apart from the stack mechanism.

The call instruction, the trap procedure and return instruction are intended to provide a formal and secure way for procedures to call or access another procedure and to return to the original procedure; and when needed, to alter the execute privilege of a process.

The normal way of changing the ring of execution of a process is via a call to a gate having a lower-numbered ring (more privilege) and subsequent outward return. An inward call represents the invocation of a user-provided protected subsystem or a supervisor procedure. An outward return represents a return to the calling procedure.

A main function of the call instruction is to allow the calling procedure (CGP) to pass parameters to the called procedure (CDP). This parameter transfer is done basically by acquiring a call frame in an appropriate stack segment and then loading this frame with the call context. A register is then loaded with a pointer to the stack base. Similarly, the trap procedure supplies parameters to a trap handler (the equivalent of a called procedure) which is responsible for resolving the current trap condition. The return instruction permits the return to the original (CGP) procedure using the parameters contained in the stack frame.

BRIEF DESCRIPTION OF THE DRAWINGS

The novel features which are characteristic of the invention are set forth with particularity in the appended claims. The invention itself, however, both as to organization and operation together with further objects and advantages thereof may best be understood by reference to the following description in conjunction with the drawings in which:

FIG. 1 is a block diagram of a data processing system capable of using the present invention.

FIG. 2A shows the format of a descriptor segment base register.

FIG. 2B shows one typical format of a stack segment.

FIG. 3A is the format of a current frame pointer utilized in addressing a frame of a wired stack segment; and FIG. 3B is the format of a current frame pointer utilized in addressing a frame of a non-wired stack segment.

FIG. 5 diagrammatically shows the state of stack segments for a process executing in ring 3.

FIG. 6 shows the state of stack segments after a procedure in ring 3 makes a call to a procedure in ring 2.

FIG. 9 shows the state of stack segments after a procedure in ring 2 makes a call to a procedure in ring 0.

FIG. 10 shows the state of stack segments after a return from a procedure in ring 0 to a procedure in ring 2.

FIG. 11 shows the state of stack segments after a return from a procedure in ring 2 to a procedure in ring 3.

FIG. 12 shows the state of the stack segments after a return from a procedure in ring 3 to a procedure in ring 3.

DESCRIPTION OF A PREFERRED EMBODIMENT

General Discussion

Figure 4B:
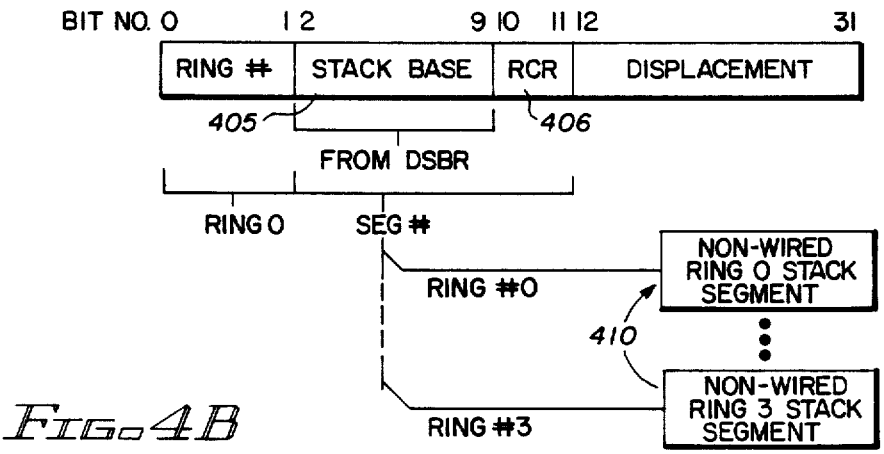
FIG. 4B diagrammatically shows the addressing of non-wired stack segments.

The invention operates typically in a hardware system environment which is disclosed in U.S. Pat. No. 4,297,743, issued Oct. 27, 1981, and entitled "Call and Stack Mechanism for Procedures Executing in Different Rings". However the environment is modified and enhanced by the invention which utilizes a call instruction or trap, along with the associated return instruction, and a new stack structure which supports both control as well as data storage. Under the prior art, as noted in column 38, lines 13–15 of the above cited U.S. Pat. No. 4,297,743, "the procedure call is effected by hardware/firmware instructions and the hardware recognizable mechanism called the stack."

The invention has control storage support which is managed by the hardware. A control frame is acquired by the hardware whenever executing a call instruction or processing a trap condition. This control frame becomes the current frame and a base register is loaded with a pointer to the base of the current stack segment (which contains the current frame). The new stack mechanism (NS) has data storage support which is managed by software. Control information (for example, the return address of the calling procedure) is stored in the frame. The called or trap handling procedure can then elect to grow the frame if it needs data storage. Upon executing a return to the original procedure, the return instruction uses the control information to identify the calling procedure or the procedure that caused the trap, and once the return to the original procedure is accomplished, the entire frame used by the called procedure is released. Thus, a frame always contains control information, while the data storage may, or may not, be present.

In response to pre-established or trap conditions, a processor may be unable to continue unambiguous execution of a currently executing program, for example upon detection of an error condition. A trap procedure must be invoked to execute a procedure to respond to the particular pre-established condition. The responding procedure may be a procedure that executes at a different (i.e., higher) level of privilege than the procedure for which the trap condition was identified. Thus, the trap procedure functions in a manner similar to the call instruction to insure that the procedure responding to the trap condition is indeed callable. Similarly, upon completion of the trap handling procedure, the return instruction permits the return to the execution of the procedure interrupted by the trap condition.

Referring next to FIG. 1, a block diagram of a data processing system capable of using the present invention advantageously is shown. The processor logic element 1 is coupled to a virtual memory management unit (VMMU) 34, a cache memory 36 and a main memory by means of bus 32. The VMMU 34 translates a virtual address described in the instruction being executed into a physical address of the main memory 50. The virtual address includes a ring number, a segment number and a displacement. The VMMU 34, after translating the virtual address into a physical address, sends the physical address on bus 32 to the main memory 50 and directly from VMMU 34 to cache memoy 36. The VMMU 34 and cache memory 36 operations are implemented in a conventional manner. The instructions can operate on data in a multiplicity of formats and can include scientific instructions. A register file 2 includes a multiplicity of registers. A number of program visible registers of register file 2 can be loaded and ready by selected instructions. The registers of the register file 2 can include general word registers, address registers, double word operand register, control registers, scientific accumulators and a descriptor segment base register. The general word registers ($R_n$) are general registers and accumulators, and can be used as index registers. The address registers ($B_n$) are base registers, RDBR designates a remote descriptor base register and a register (T) can be the stack pointer. The double word operator registers ($K_n$) are general registers and accumulators and can be used for indexing. The control register (S) stores the process status security keys and stores the current security ring being processed. The processor 3 supports a number of rings, typically four. The rings are the mechanism to provide a secure data processing system. All software procedures consisting of operating system and application procedures execute in preassigned rings to insure protection between the procedures. A ring alarm register in register file 2 is examined during the execution of a return instruction. The descriptor base register defines the current process address space. The program counter 14 stores the address of the current instruction being executed and is normally incremented to point to the next instruction except when a jump or branch is indicated. An indicator register file 24 can include the basic operations (BOPS) indicator register 24-2, the commercial indicator register (CI) 24-4, and the scientific indicator register (SI) 24-6. A mode register file 26 includes BOPS mode registers 26-2, a commercial mode (CM) register 26-4 and a scientific mode register (SM) 26-6. The mode registers contain control information which is used during instruction execution.

During execution of an instruction, the program counter 14 is incremented to point to the location of the next instruction. The next instruction is received by the data-in unit 16 from the cache memory 36 over bus 32. The instruction is assembled in the instruction prefetch unit 18 and then transferred to branch unit 20. In branch unit 20, the operation (OP) code is decoded, the status of the indicator registers 24 and the mode registers 26 is examined to determine whether special handling of the instruction is required. A next address logic 22 receives logic signals to generate a starting address. The starting address is sent to a read only store 38 over bus 42 to fetch the microword controlling the execution of the instruction by processor 3. The binary unit 11, which includes a binary arithmetic logic unit 4, a Q register 6 and a shifter 8 process binary and hexidecimal operands, while decimal unit 10, which includes a decimal arithmetic logic unit 10-6, a multiplier register 10-2 and a multiply read only memory 10-4, process decimal operands. An exponent unit 12, which includes an exponent register file 12-2 and an exponent arithmetic logic unit 12-4, processes the exponent portions of floating point operands.

Referring now to FIG. 2A, the descriptor segment Base Register is shown. Word O

Bit O 201 is the New Stack Indicator (NS). When this bit is set to 1, then the new call and return instructions are allowed and they will cause a frame to be acquired/relinquished in the appropritate stack segment of the new stack. A trap can also be mapped in a call and result in a frame being acquired in the appropriate stack segment of the new stack. When this bit is set to O, then the new call and return instructions are not allowed and a program error trap is posted.

Bit 1 202 is a new I/O indicator (NI). When this bit is set to 1, execution of I/O instructions requires new I/O handling.

Bits 2 and 3 203 are reserved for hardware use (RHU).

Bits 4–15 204 from the high order 12 bits of a 20 bit physical page frame address of a descriptor segment page table. The numerals (0:11) indicate that only bits 0–11 of the page frame number are in bit positions 4–15 of word 0. Word 1

Bits 0–7 form the low order 8 bits of the 20-bit physical page frame address of the descriptor segment page table (DSPT). The numbers (12:19) indicate that only bits 12 through 19 of the page frame number are to be found in bits 0–7 of word 1.

Bits 8–15 in an Offset Address that allows a page table to start on a modulo 4 word boundary. The numbers (0:7) indicate that the 8 bits of the offset are in bit positions 8 through 15 of word 1. Word 2

Bits 0–1 207 are reserved for hardware use (RHU).

Bits 2–9 208 form a Stack Base Address. This 8-bit field and the 2-bit R current define the segment number of the current stack segment when using the new stack mechanism NS. Word 3.

Bits 0–5 210 are reserved for hardware use (RHU).

Bits 6–15 211 is a Segment Descriptor Table Size. This field contains a 10-bit size field. When a virtual address (VA) is greater than the segment descriptor table size, then a segment trap results.

Referring now to FIG. 2B, a typical ring in stack segment is shown. It should be noted that the stack segment is divided into a stack header, which is further subdivided into the portion of the stack segment which is for software use. A portion of the stack segment for hardware use stores a current frame pointer (CFP) 250 and a current frame length (CFL) 251. The current frame pointer CFP is shown in FIGS. 3A and 3B. FIG. 3A shows how the CFP is generated when referencing a wired stack segment. FIG. 3B shows how the CFP is generated when referencing a non-wired stack segment. A base address register (B4) points to the base of the stack segment following a call or trap.

Referring to FIG. 3A, bits 0–1 301 store the ring number of the stack. (Note that since this is the wired stack segment, the value will always be 0). Bits 2–11 302 store a stack base address, stack base-1-CSS# (CSS# being the central processor number), which indicates the base where the ring 0 wired stack segment is located. Bits 12–31 303 indicate the displacement from the stack base where the current frame is located. (The current frame length CFL is a 32-bit unsigned integer whose value is CFL≦$2^{20}$; in the non-wired version the integer would be 230.) Referring to FIG. 3B, bits 0–1 304 and 10–11 306 store the ring number of the stack. The stack base is in bits 2–10. Bits 0–1 and bits 10–11 are concatenated to the stack base to arrive at the segment number for the stack segment of that particular ring. The displacement in bits 12–31 305 is the same as in FIG. 3A.

Frame 1 of the ring n stack segment is divided into the link $L_1$253, control storage $CS_1$253 and data storage $DS_1$254. The link is a pointer to the previous stack frame; link $L_2$255 of Frame 2 points to $L_1$252 of Frame 1. The control storage area $CS_2$256 stores control information, such as, for example, the return address of the calling procedure. The data storage area $DS_1$254 is optional and is utilized to store data that may be required by the called procedure.

The Frame Current is the current frame being utilized by the called procedure and is divided into a link $L_2$255 and control storage $CS_2$256. The control storage performs the same function as any frame which stores control information.

The new stack mechanism (NS) is a per-process stack to ensure isolation and thus protection among processes. Furthermore, the new stack mechanism (NS) is consistent with the concept of ring protection. Specifically the stack is subdivided into compartments in order to insure that the procedures may access only those compartments for which they are authorized. Since the virtual memory (VM) implementation defines the segment to be the unit of protection, the compartments referred to above are actually segments. It should be further noted that the NS also supports the concept of wired and non-wired stack segments. (A wired stack is always present in main memory; therefore when it is referenced no page fault will ever occur. A non-wired stack resides in virtual memory, and on a given reference a part of it may not be in main memory.)

The wired stack is required because the procedures of a process actually consist of user and operating system (OS) procedures. Some of the OS procedures cannot tolerate page faults. They must use a wired stack segment. All other procedures will use the non-wired stack segments. To minimize the amount of wired space, one wired ring 0 stack segment per processor, rather than one wired ring 0 stack segment per process, is utilized. The wired ring 0 stack segment of processor n becomes the wired ring 0 stack segment of the process currently running on processor n. Thus, the NS is actually a stack that consists of n (one per processor) wired ring 0 stack segments and 3 consecutive non-wired stack segments (one each for rings 0, 1 and 2) and one or more consecutive, non-wired stack segments for ring 3.

Figure 4A:
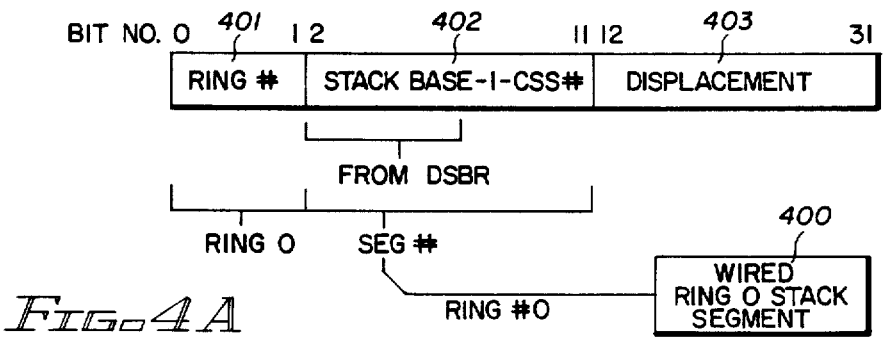
FIGS. 4A diagrammatically shows the addressing of wired stack segments.

Referring now to FIGS. 4A and 4B, the format of addressing the wired ring 0 stack segment 400 and the non-wired stack segments 410 for rings 0 through 3 is shown. The stack base address of the wired ring 0 stack segment is obtained from Word 2 of the descriptor segment base register shown in FIG. 2A and stored (minus 1 minus CSS#) in bits 2–11 402 of the current frame pointer as shown in FIG. 4A. Since the frame pointer is generated by the hardware, the ring number stored in bits 0–1 401 is 0. Utilizing the segment number and the ring number, the wired ring 0 stack segment can be located. Finally the displacement address stored in bits 12–31 403 indicates the address of the required word in the ring 0 stack segment.

FIG. 4B shows the format for addressing the non-wired stack segments 410 for rings 0 to 3. It is similar to the format for FIG. 4A except that the segment number is obtained from the stack base address stored in bits 2–9 405 and from the Ring Current RCR stored in bits 10–11 406.

Referring now to FIGS. 5 and 6, the state of three of the non-wired stack segments following initialization by the software and how the non-wired stack segments are managed by the hardware as a result of the call instruction is shown.

FIG. 5 shows the state of the stack for a process currently executing in ring 3 which uses the stack frame called Frame Current 610 for its control and data information. It has been called from another procedure also operating in ring 3 with its stack frame indicated as Frame 1 610. Base address register B4 points to the CFP 606 in the Current stack segment base, which in turn contains a pointer 606A to the link word of the current frame 603, which in turn contains a pointer 604 to the link word of the previous frame 605. This chain of links from the current frame backwards allows the chain of procedure calls by which the current procedure was reached, to be traversed in the return direction when the current procedure is completed. The current frame pointer 606 in the ring 3 stack segment 650 provides a pointer to the link word for the topmost frame in that particular stack so that firmware can find this top frame any time the firmware procedure needs to identify this top frame. The ring 0 stack segment 652, and ring 2 stack segment 651 in FIG. 5 are both empty as noted by their current frame lengths being 0 in boxes 607 and 608. Empty ring stack segments will be normally the case for any procedure executing in the outer ring. Note that an empty stack segment may contain process state information in the software use area of the stack header. Process state information of long persistence, potentially for the life of the process, is expected to reside here.

FIG. 6 shows the state of the stack a short time later after the procedure which was using the frame current in FIG. 6 has made a call to another procedure to be executed in ring 2. The stack frame that had been labelled Frame Current in FIG. 6 is now shown as frame 2 for the ring 3 stack segment in FIG. 5. Frame Current 631 has moved over into the ring 2 stack segment 651 because the called procedure is executing in ring 2. The link field for this frame 701 points back to the stack frame of the caller; i.e., to frame 2 620 of the ring 3 stack segment. Only control information 702 is shown for the Frame Current 631 in the ring 2 stack segment 651 since the called procedure has not acquired any data storage.

Figure 7:
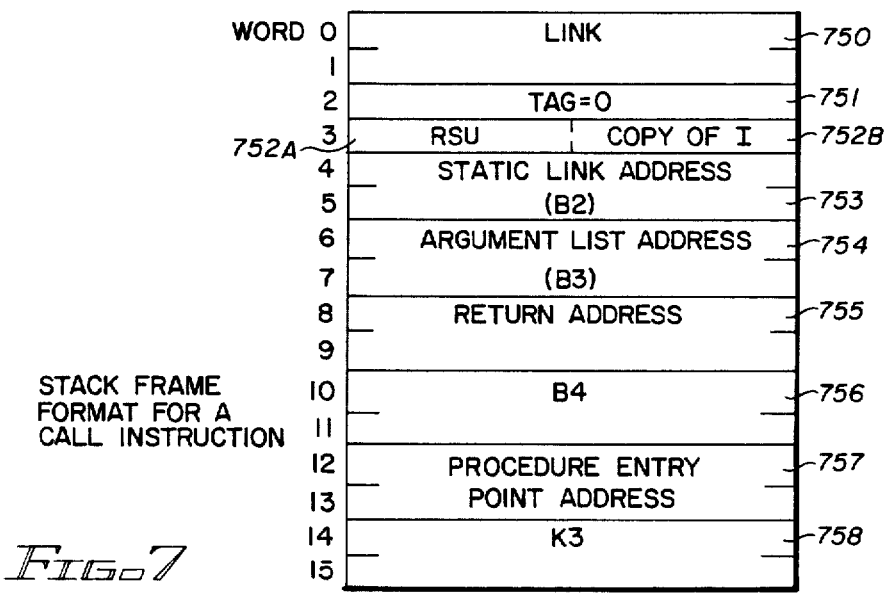
FIG. 7 shows the stack frame format for a call instruction.

Referring next to FIG. 7, the format of the stack frame for call instructions is illustrated. The word 0 and word 1 750 of the frame contain the link address information. Word 2 751 contains the tag information. A portion 752A of word 3 of the call frame is reserved for software use, while a second portion 752B of the word 3 contains a copy of the indicator (I) register. Words 4 through 9 store the static link address (from a base address register) 753, the argument list address (from a base address register) 754 and the return address 755. The ring # is included in the return address to determine the privilege of the CGP. Words 10 and 11 756 store the contents of B4 from the CGP, words 12 and 13 757 store the procedure entry point address and words 14 and 15 758 store the contents of the K3 register.

Referring now to FIGS. 8A-8D, the steps implementing the call instruction according to the present invention are shown via a sequence of flowcharts. This instruction is implemented using firmware techniques. The call instruction is utilized to specify a transfer of control from a calling procedure (CGP) to the called procedure (CDP). An effective address (EA) defines the CDP and its entry point. An R effective (REF) defines the effective execute privilege of the CDP.

Figure 8A:
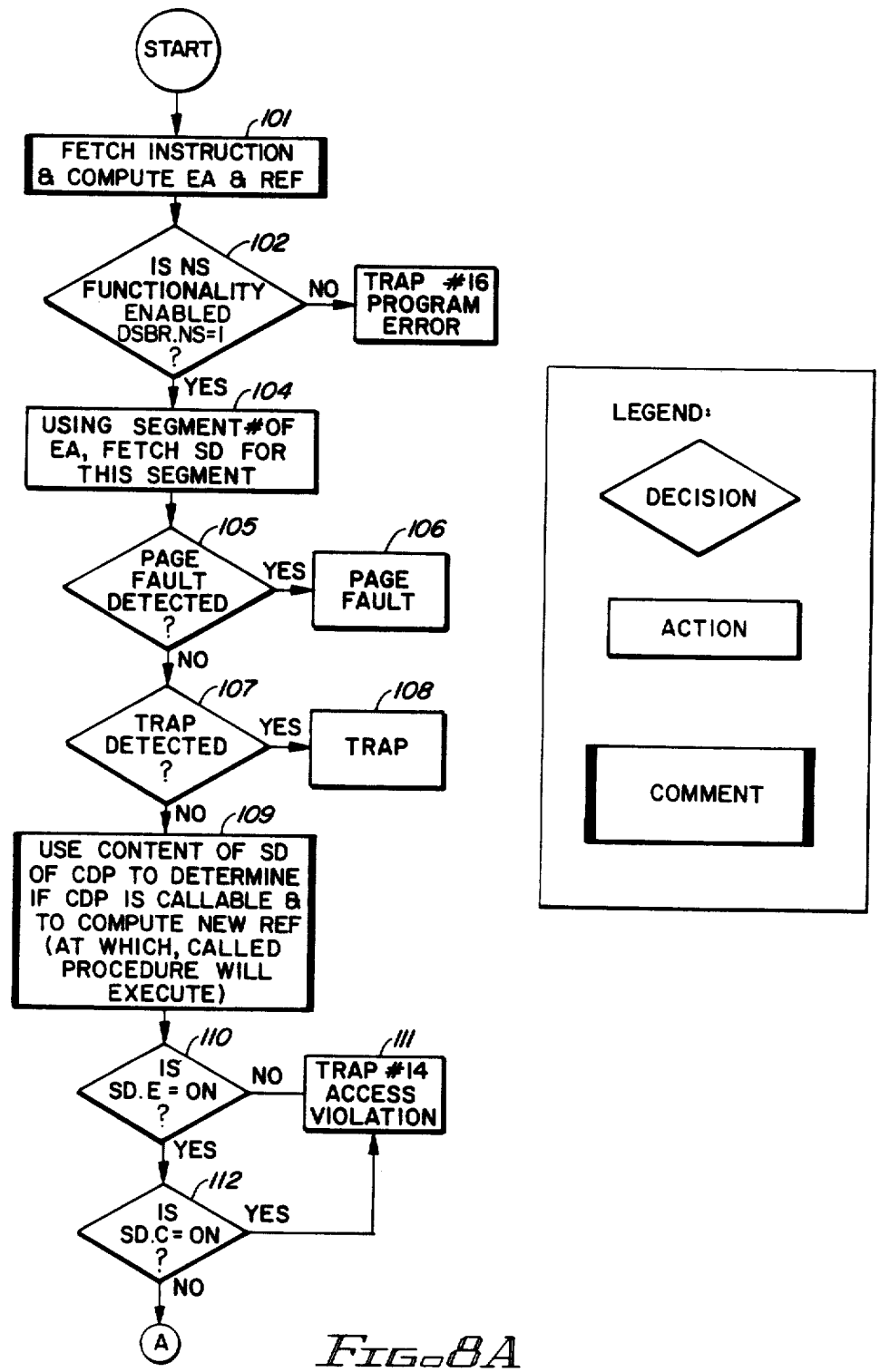
FIG. 8A is a flow chart of the steps initiating a call instruction

Referring to FIG. 8A, the call instruction is fetched and the effective address (EA) and REF are computed. See block 101. This determines the procedure to be called and the entry point of the procedure. The next step 102 determines whether or not the new stack functionality (NS) is enabled. When it is not enabled, the instruction is trapped as shown in box 103. When NS is enabled, the segment number specified in the effective address is utilized to fetch a segment descriptor for the segment which contains the procedure to be called during step 104. Then in steps 105 and 107, checks are performed to ensure that no page faults or traps occur while performing this function. When no faults or traps are detected, the segment descriptor (SD) which was fetched in step 104 is utilized to determine whether the called procedure (CDP) is indeed callable and to compute the new ring effective number (REF) in which the called procedure will execute. See step 109. In step 110 a check is made that determines whether the execute bit E of the called segment (procedure) is ON. When bit E is not ON a trap #14 (in step 111) is posted. In step 112, a check is made to determine whether the compatibility bit C of the segment descriptor is ON. When bit C is on, then a trap #14 of step 111 is posted. When bit C is not ON, go the next step 113 in FIG. 8B.

Figure 8B:
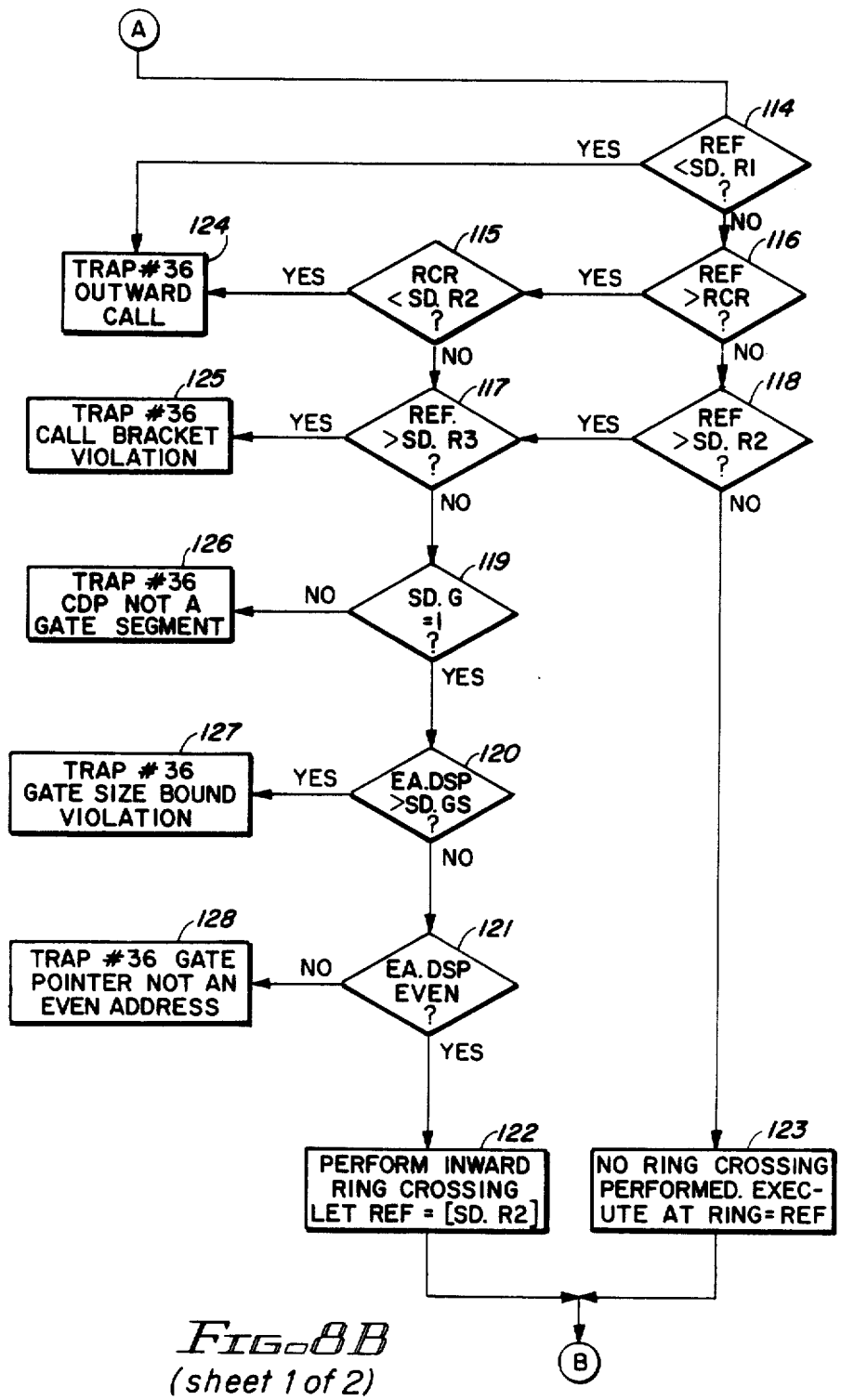
FIG. 8B is a flow chart of the steps of the call instruction initiated din FIG. 8A.

Referring now to FIG. 8B, there is shown a flowchart that shows the checks that must be performed to determine whether a call is indeed possible. Three possibilities can occur. One, the call is successful and no ring change takes place. Two, the call is successful and a ring change takes place. Three the call is not allowed. When the called and calling procedures are peer procedures; i.e., have the same execute privilege, then the call will be successful and no ring change takes place. This path is shown by steps 114, 116, 118 and 123. The tests are performed in steps 114 and 118, in this case, basically state that SD.R1≦REF≦SD.R2 or that REF is within the execute bracket of the called procedure.

When the called procedure has greater privilege than the calling procedure, then the call will be successful only when certain conditions are met. When all these conditions are met, then the call will be successful and a ring change takes place. This path is shown by steps 114, 116, 118, 117, 119, 120, 121 and 122. When the call is not successful, then the path through steps 114, 116, 118 and 117 will terminate at any of the following steps, 125, 126, 127, or 128. The tests performed in steps 114 and 118, in this case, basically state that SD.R2<REF or that REF is not within the execute bracket of the called procedure and that the following conditions must be met to successfully complete the call.

Step 117 determines whether or not the calling procedure is outside the call bracket of the called procedure. (The call bracket is the range of ring numbers in which a calling procedure must be executing in order to call the called procedure.

When the calling procedure is outside the call bracket of the called procedure, then a trap 125 is evoked. When it is not, then the next step 119 is entered. In step 119 there is a check made to determine whether the called procedure is a gate procedure. (A gate procedure is required in this case because the calling procedure, although within the call bracket of the called procedure, is not within the execute bracket of the called procedure and thus may enter the called procedure only through the gate.)

Accordingly in step 119 a check is made to determine whether the gate bit of the segment descriptor is a 1. When the gate bit is a 1, then step 120 is entered. When the gate bit is not a 1, a trap 126 is taken which indicates that the called procedure is not in a gate segment. In step 120, a check is made to determine whether the displacement of the Effective Address is within the gate array. (A gate array enumerates the entry points of the procedure segment in order to insure that control is not transferred to the procedure via an inward ring crossing call at a location other than at one of the entry points).

When the answer to this test is yes, then there is a gate size violation and a trap 127 is entered. When the answer is no, indicating activity within the gate array, then step 121, is entered. In step 121 a check is performed to determine whether the effective address EA is an even address to insure that a pointing to the first word of a pointer which points to the called procedure. When the answer to this test is no, a trap 128 is entered. When, on the other hand the answer is yes, an inward ring crossing is performed as shown on step 122.

When the called procedure is less privileged than the calling procedure, then the call is not allowed as this would result in an outward call attempt. This path is shown by steps 114 and 124. The test performed in step 114, in this case, basically states that REF<SD.R1 or that REF is more privileged than the execute bracket of the called procedure.

When privilege was lost during the computation of REF in step 101 of FIG. 8A, then the path shown by steps 114, 116 and 115 must be taken to protect against an outward call attempt. The test performed in step 116, in this case, states that privilege was lost during the computation of REF since REF is less privileged than RCR. Thus the test performed in step 115 is required to insure that the original (RCR) privilege of the calling procedure is not more privileged than the lowest privilege of the called procedure (SD.R2). When the answer to test 115 is Yes, then an outward call is being attempted and a trap 124 is entered. When the answer to test 115 is No, then proceed when the called procedure has greater privilege than the calling procedure via steps 117, 119, 120, 121 and 122.

Beginning with step 130, a flowchart, wherein a call frame is acquired in the appropriate stack segment (SS) of a new stack mechanism (NS) (see step 133), after a check is made for a call/return trace trap, i.e., is M6.CT,CS=1,0 in step 130 and step 131. When the test is true, then trap 30, the call/return trace is initiated in step 132. Otherwise, compute the value of the link to be stored in the call frame by reading the current frame pointer (CFP) in the current stack segment (CUSS). See step 134 and also FIG. 2. In step 135 the current ring number RCR is used to compute the virtual address VA of the current stack segment CUSS. The CUSS contains the current frame which belongs to the calling procedure CGP. The header of the CUSS contains the current frame pointer CFP. The CFP is the value on the link to be stored in the call frame. See step 149 and FIG. 2. Steps 136 and 138 determine whether or not a page fault or trap was detected.

The flowchart now shows how to compute the location where the call frame is stored. Depending on whether or not a ring change occurs, a new call frame will either be appended to the current stack segment or to an inner ring stack segment when the ring crossing takes place. In step 142, the virtual address VA of the target stack segment TSS is computed in order to be able to fetch its current frame pointer Cfp and the current frame length CFL. See also FIG. 2. In step 143, the R effective REF, the CSS# and the level # are utilized to find out where the target stack segment is by computing the virtual address of the target stack segment base. The first four words of the target stack segment containing the current frame pointer and the current frame length is read. These are utilized to compute the address of a new frame. In steps 145 and 147 a check is made for page faults and traps to insure that the operation can be successfully completed.

Figure 8C:
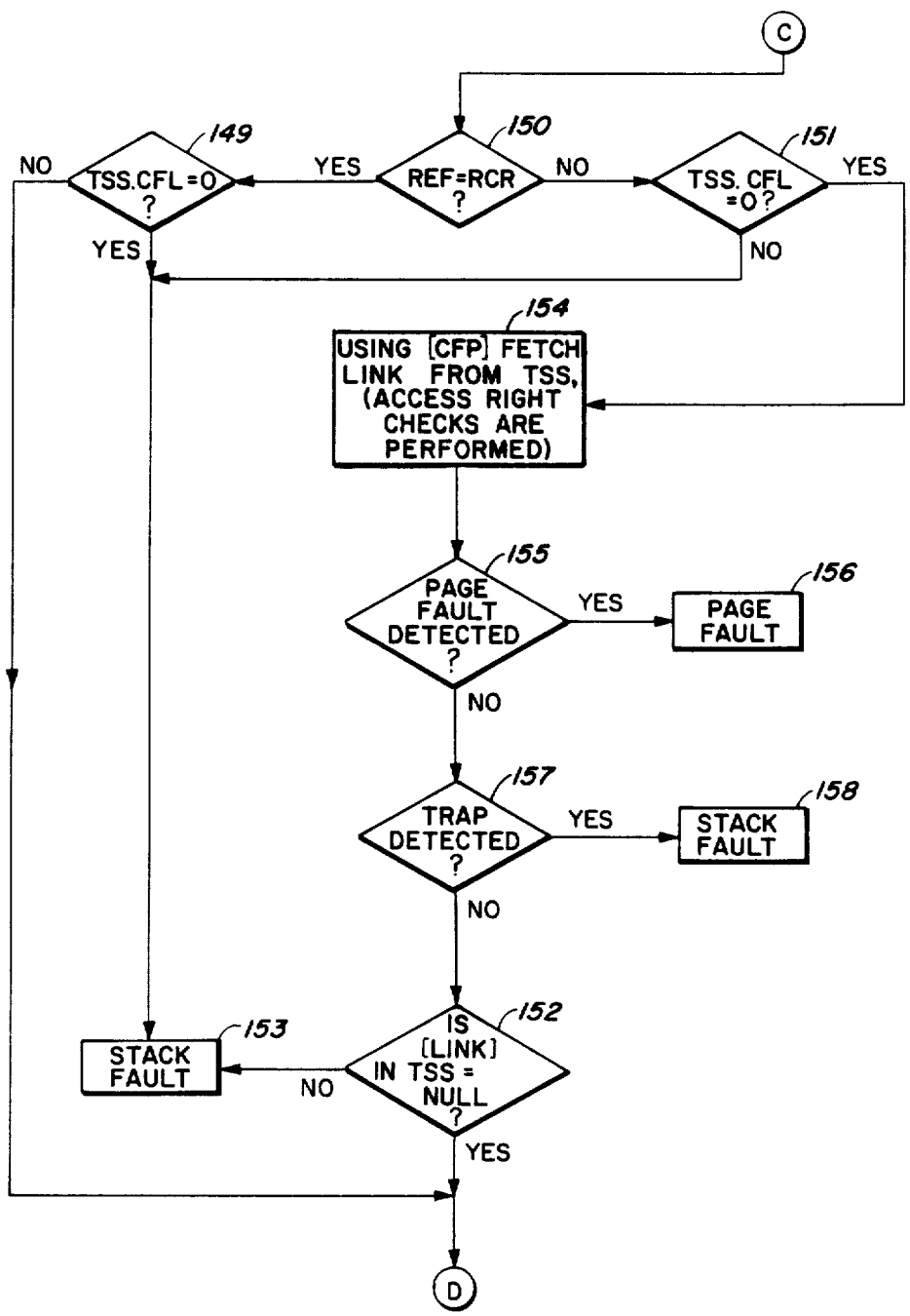
FIG. 8C is a flow chart of steps continuing the call instruction of FIG. 8B.

Referring to FIG. 8C in step 150, a determination is made whether a ring change has been performed. When R effective REF and R current RCR are equal, then the new call frame is being placed in the same stack segment which is the current stack segment and checks are performed to insure the integrity of the stack shown in step 149. (Integrity means that everything is as it should be; i.e., consistent state.) The stack's integrity is insured when the current frame length CFL stored in the header of the stack segment is not equal to 0. When, on the other hand, REF is not equal to RCR as determined in step 410, there is an indication that an inward ring change is necessary and two different stack segments are involved, the current stack segment and the target stack segment. This case indicates that in going from an outer ring to an inner ring, the target stack segment cannot possibly contain a stack frame at this time. Accordingly, its current frame length must equal 0, as shown in bos 151. When its current fram length does equal 0, then in step 154, the link is fetched from the TSS using the current frame pointer. After testing for a page fault in step 155 and a trap in step 157, then step 152 is entered where a final check on the integrity of the stack is made. Accordingly, a new frame is placed in the target stack segment. The format of this target stack segment requires that the LINK pointed to by the current pointer be null.

Figure 8D:
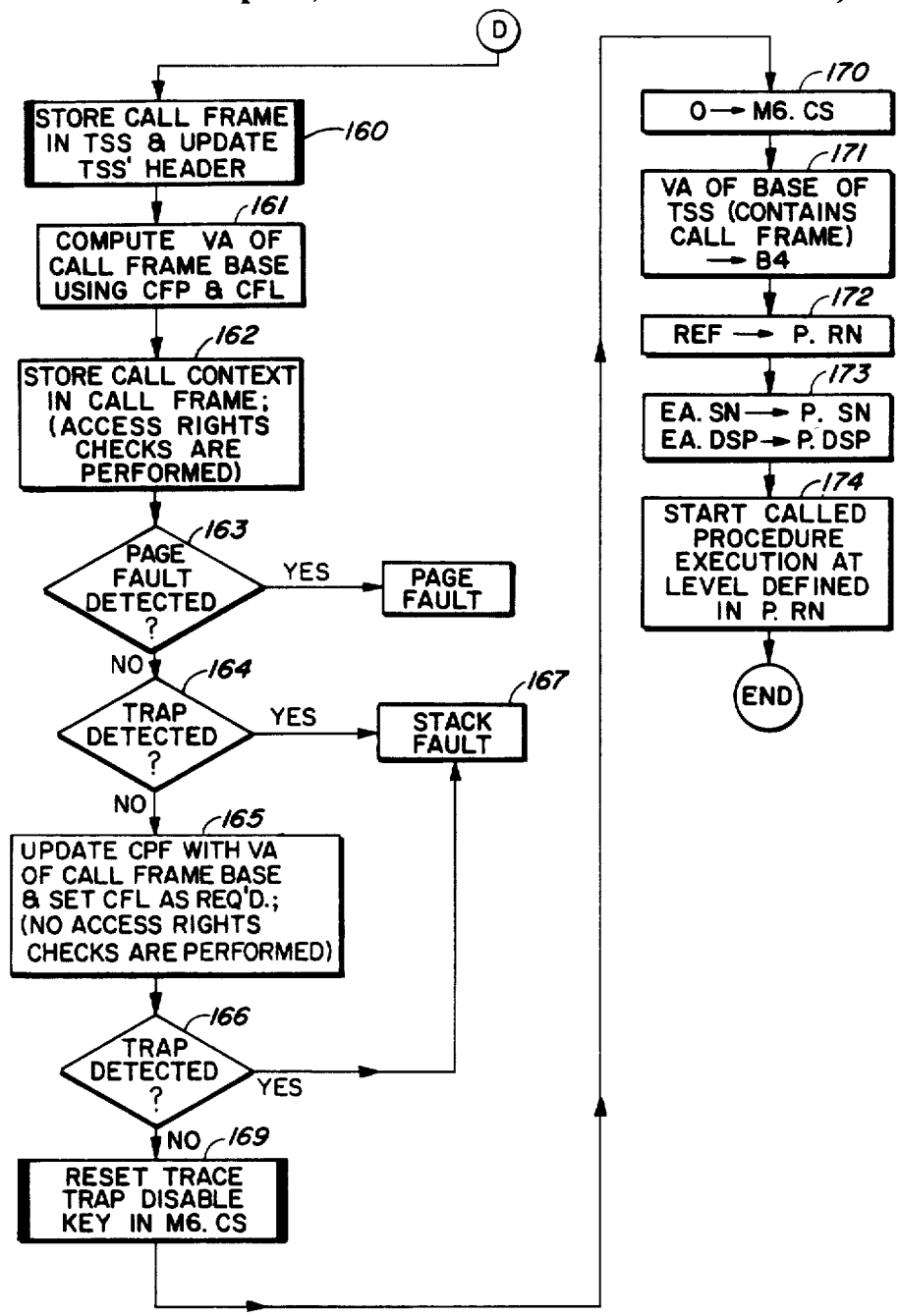
FIG. 8D is a flowchart of steps concluding the call instruction of FIG. 8C.

Referring now to FIG. 8D the call frame is stored in the target stack segment and the target stack segment's header is updated. In step 161, the virtual address or the called frame is computed using the current frame pointer CFP and the current frame length CFL. The call context is stored in the call frame in step 162. (A call context is information that indicates the state of a procedure when it was entered and is used to allow that procedure to access arguments passed to it and restore as necessary the processor state upon return to the calling procedure.)

Then, the steps 163 and 164, a check is made to determine whether a page fault or trap was detected. Once this has been performed, the current frame pointer is updated with the virtual address of the call frame base and the current frame length CFL is set as required in step 165. In step 166 a determination is made whether or not a trap was detected. When there was a stack fault, step 167, results otherwise the next step E is entered.

The trace trap disable key in M6.CS is reset by entering 0 therein in step 169 and step 170. The virtual address VA of the base of TSS (which contains the call frame) is entered in register B4 (as shown) in step 171. The R effective REF is then loaded into the ring number field of the procedure pointer register P.RN. See step 172. In step 173, the effective address EA (EA.SN and EA.DSP) is loaded into the procedure pointer register P. Finally, in step 174, the call procedure execution is started.

Referring next to FIG. 9, the state of the stack segments is shown after a procedure executing in ring 2 makes a call to a procedure executing in ring 0. The procedure executing in ring 0 (the called procedure) becomes the current procedure and frame 4 950 becomes the current frame. B4 points to the base 905 of the ring 0 stack segment 652 and the link location 901 of the current frame references the frame 3 link location 701, the link location 701 of the calling procedure. The remainder of the stack segments remain the same as in FIG. 7.

During the return procedure (i.e. from the state shown in FIG. 9), the resulting state is shown in FIG. 10. As a result of the return instruction, frame 4 950 is released and frame 3 951 becomes the current frame. The procedure that had called the ring 0 procedure becomes the current procedure. The ring 0 header 952 is updated such that the current frame length (CFL) location 608 is set equal to zero and the CFP location 905 is made to point to a null entry which replaces the link in location 901.

In FIG. 11, after the return from the procedure in ring 2 to the procedure in ring 3, frame 3 631 is released and frame 2 620 becomes the current frame. The procedure that called the ring 2 procedure becomes the current procedure. The ring 2 header 635 is updated such that the current frame length (CFL) location 607 is set equal to zero and the current frame pointer (CFP) location 607 is made to point to a null entry which replaces the link in location 701.

In FIG. 12, when a current procedure in ring 3 (Frame 2 620) returns (from the state shown in FIG. 11) to the calling procedure (Frame 1 610) in ring 3, Frame 2 is released and Frame 1 becomes the current frame of the procedure to which execution is being returned. The length of Frame 1 (now the current frame) is placed in the CFL location 609 of the ring 3 header 640. The current frame pointer 606 of the ring 3 stack segment points to the link (=null because this frame is the last frame of the stack) location 605 of the current Frame 1.

Figure 13A:
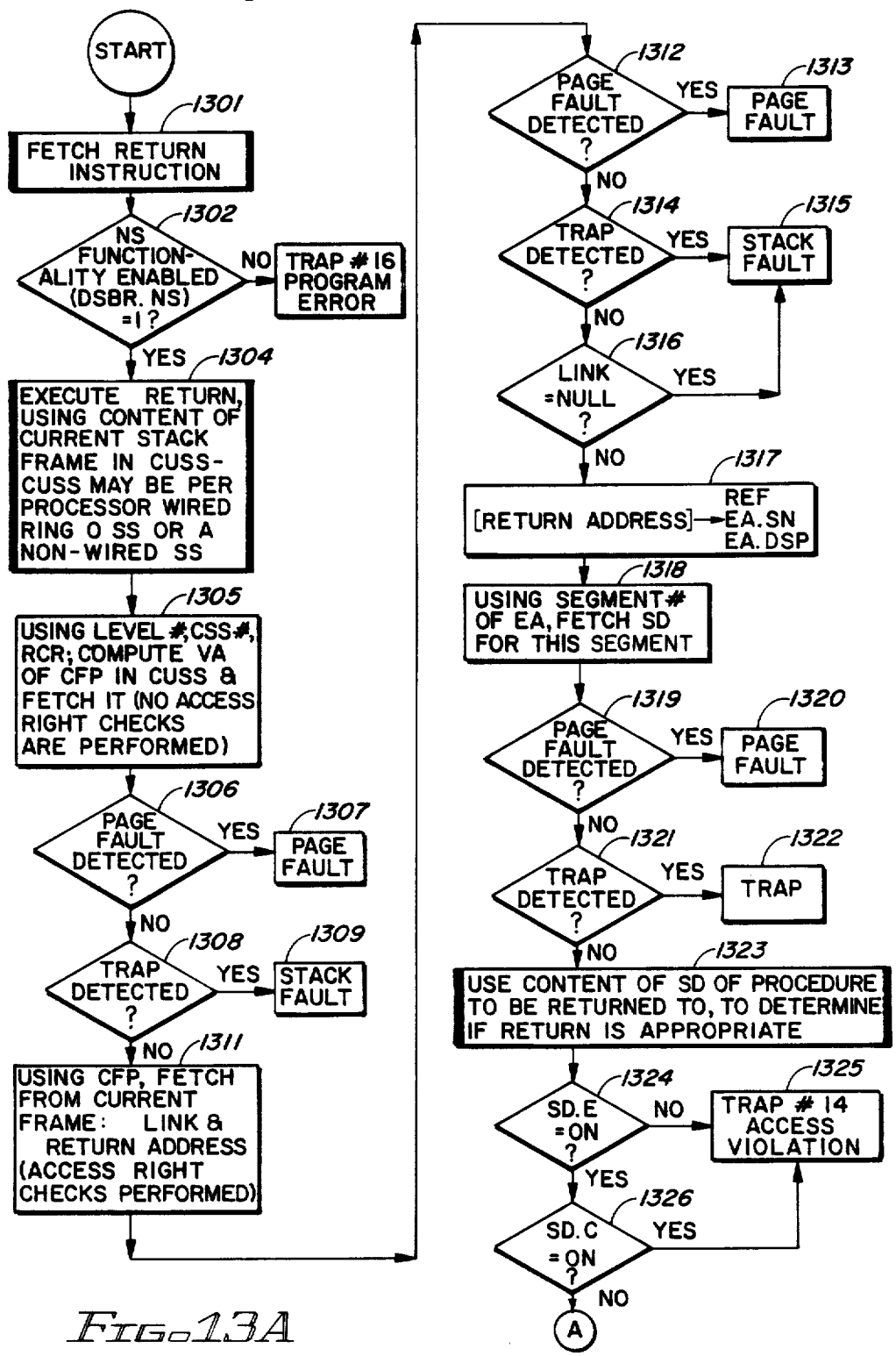
FIG. 13A is a flow chart of charts for the steps initiating a return procedure
Figure 13B:
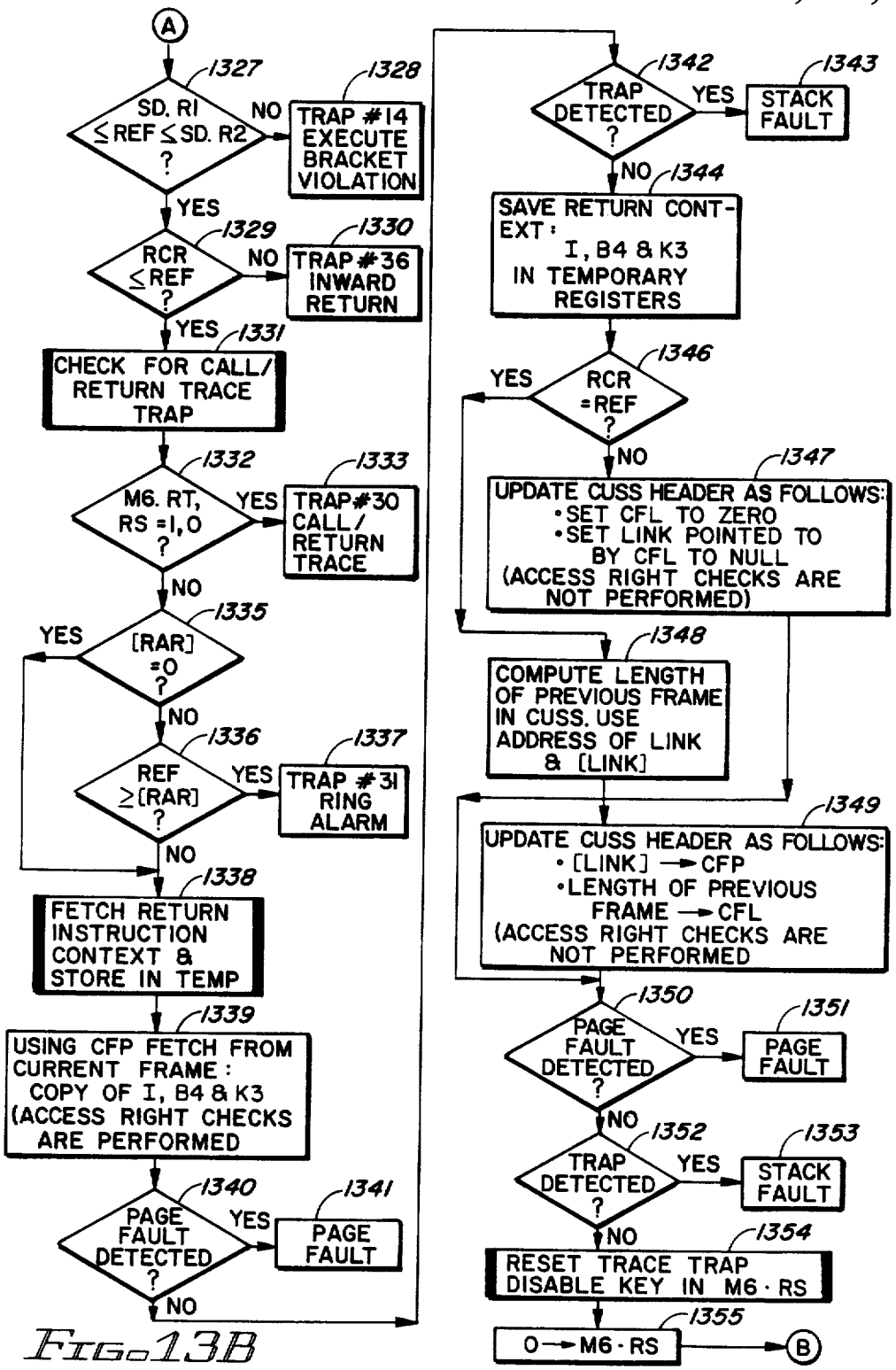
FIG. 13B is a flow chart of steps continuing the return procedure of FIG. 13A.
Figure 13C:
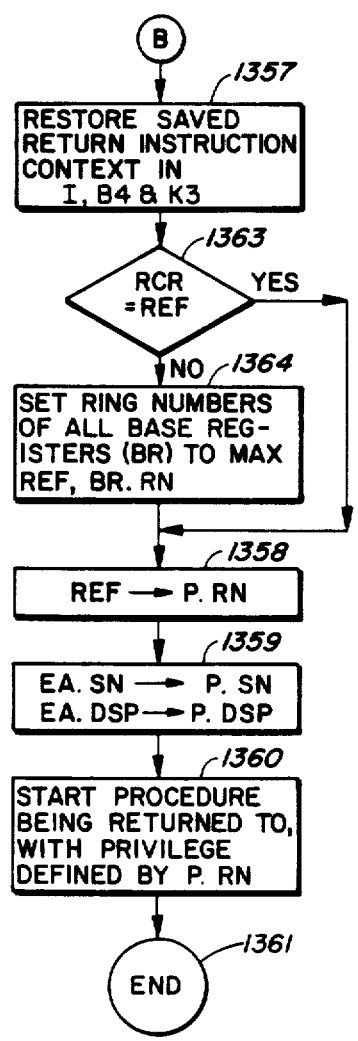
FIG. 13C is a flowchart of steps concluding the return procedure of FIG. 13B, according to the present invention.

Referring next to FIGS. 13A–13C, the technique for implementation of the return instruction is illustrated in the flowchart. The return instruction is utilized to specify a transfer of control from the called procedure (CDP) to the calling procedure (CGP). The return instruction is implemented using firmware techniques to preserve the integrity of the procedures.

Referring now to FIG. 13A, the return instruction is fetched in step 1301. In step 1302, a test is performed to determine when the new stack (NS) functionality is enabled, i.e. does (DSBR.NS=1). When the NS functionality is not enabled, then post a program error trap. When the NS functionality is enabled above, the return instruction is executed, using the contents of the current stack frame in the current stack segment (CUSS). The current stack segment can be a per processor wired ring 0 or can be a non-wired stack segment. In step 1305, using the current level number, the processor number (CSS #), and the current privilege level, the virtual address (VA) of the current frame pointer (CFP) in current stack segment (CUSS) is computed and fetched. (In this step, no access right checks are performed.) In step 1306, a test is performed to determine whether a page fault has been detected. When a page fault is detected, then the program executes a page fault procedure in step 1307. When a page fault is not detected, then a test is made, in step 1308, to determine whether a trap condition has been detected. When a trap condition has been detected, then a stack fault routine is entered step 1309, otherwise, the execution of the return instruction is continued.

Continuing the flow diagram of the return instruction, using the current frame pointer (CFP), the link address and the return address are fetched from the current frame in step 1311. (Access right checks are performed as part of this step.) In step 1312, a test was made to determine whether a page fault has been detected. When a page fault has been detected detected, then the page fault procedure 1313 is implemented. Otherwise, a test is made to determine whether a trap condition has been detected in step 1314. When a trap condition was detected, then a stack fault procedure 1315 is instituted. Otherwise, a test is made to determine whether a link address is present (IS LINK=NULL?) in step 1316. When the link address is not present, then the stack fault procedure of step 1315 is instituted. When the condition is not true, then, in step 1317, the return address supplies the ring effective number (REF), the effective address segment number (EA.SN) and the effective address displacement (EA.DSP). In step 1318, using the segment number of the effective address (EA), the segment descriptor (SD) for this segment is fetched. In step 1319, a test is performed to determine whether a page fault has been detected. When a page fault is detected, then a page fault procedure of step 1320 is instituted. When a page fault was not detected, a test is performed to determine whether a trap has been detected. When a trap is detected, then a trap procedure 1322 is instituted, otherwise, the return instruction is continued.

The contents of the segment descriptor (SD) of the procedure to which control is returning is used to determine when the return instruction is appropriate in steps 1323, 1324, 1326, 1327 and 1328. In step 1324, the determination is made when the SD.E=on (i.e. is the calling procedure executable?). When the SD.E is not on, then an access violation trap routine is performed in step 1325. When the SD.E is on, then a determination is made in step 1326 whether or not SD.C=off (i.e. is the compatibility bit on). When the SD.C is on, then an access violation trap routine 1325 is instituted. Referring now to FIG. 13B, when the SD.C is not on then the determination is made in step 1327 when the ring effective number (REF) is within the execute bracket of the calling procedure, i.e. SD.R1≦REF≦SD.R2. When the REF does not meet these conditions then a trap routine, in step 1328, is initiated. Otherwise, a determination is made whether or not the ring effective number (REF) is greater than or equal to the original privilege level (RCR) in step 1329. When this condition is not met, then a trap routine in step 1330 is initiated. When the condition is true, then, in steps 1331 and 1332, a check is made for a trace trap by determining whether the M6.RT,RS=1,0. When the condition is true, then the appropriate trap routine is initiated. Otherwise, the execution of the return instruction continues.

The determination is made when the contents of the ring alarm register are zero in step 1335. When the contents of the ring alarm register are not zero, then in step 1336, the determination is made whether the contents of the ring alarm register are less than or equal to the ring effective number. When the condition tested in step 1336 is true, then a trap procedure is entered in step 1337. When the result of steps 1335 and 1336 are false, then in step 1338 including steps 1339 and 1344, the return instruction context is retrieved and stored in temporary registers. This is done in step 1339, using the current frame pointer, to fetch from the current frame a copy of the indicator register (I), B4 and K3. (The access right checks are performed in this step.) In steps 1340 and 1342, a determination is made whether a page fault or a trap has been detected and, if so, an appropriate routine is entered in step 1341 or in step 1343. In step 1344, the current context from appropriate registers is saved in the temporary registers.

In step 1346, the determination is made when the original privilege level (RCR) is equal to the ring effective number (REF). When the two values are not equal, then the current stack segment header is updated by setting the current frame link to zero and setting the link pointed to by the current frame pointer to null. When the condition in step 1346 is true, then the length of the previous frame in current segment stack is calculated using the link and its address. Following the calculation of the length, in step 1349 the current segment stack header is updated by storing the contents of the link field in the current frame pointer and placing the length of the previous frame in the current frame length field. Following steps 1349 and 1347, the occurrence of a page fault or of a trap is determined in step 1350 and step 1352 and an appropriate routine is entered in step 1351 or in step 1353. In step 1355 the trace trap is reset by disabling the key in M6.RS.

Referring next to FIG. 13C, in step 1357, the return context is restored to the following processor registers, indicator register I, the base address register B4 and the double word operand register K3. In step 1363, a determination is made to determine whether the return causes a ring change. When a ring change occurs, then the ring numbers of all the base registers are set to the least privilege of REF and the base register ring number in step 1364. When there is no ring change, th ring numbers of all the base registers (RN) are not changed. The ring effective number (REF) is entered in P.RN, the pointer register ring number step 1358. In step 1359, the return address defined by the segment number of the effective address (EA.SN) and the displacement of the effective address (EA.DPS) is entered into the equivalent fields (P.SN) and (P.DPS) of the procedure register. In step 1360, the procedure to which control is being returned is initiated with the privilege level defined by procedure register ring number (P.RN).

Figure 14:
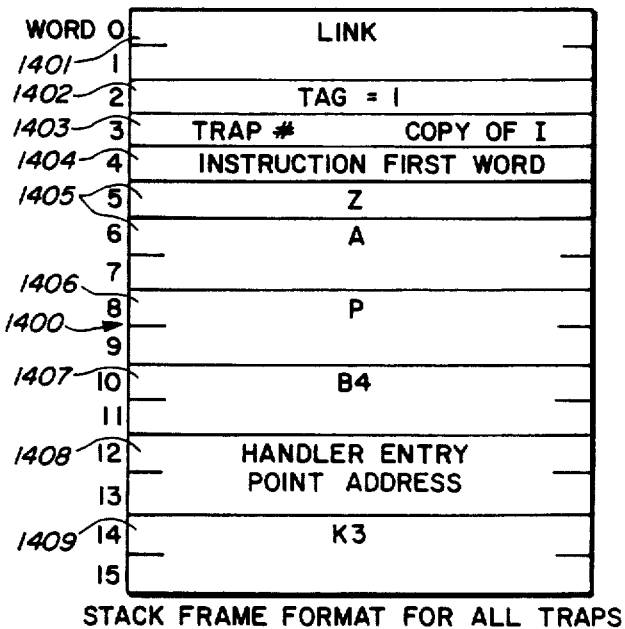
FIG. 14 illustrates the trap context format according to the present invention.

Referring next to FIG. 14, the stack frame entries for the trap frame are shown. The word 0 and 1 locations 1401 of the trap stack frame 1400 contain the link pointer. The word 2 location 1402 stores TAG=1, indicating that data related to a trap is contained therein. The word 3 location 1403 contains the associated trap number and a copy of the indicator register I. The subsequent word 4 location 1404 includes a copy of the first word of the instruction. The word 5, 6 and 7 locations 1405 contain miscellaneous information and an address respectively. The word 8 and 9 locations 1406 include the contents of the procedure counter. The word 10 and 11 locations 1407 store the contents of the B4 register, while the word 12 and 13 locations 1408 store the address of the entry point of the procedure handling the trap. And word locations 14 and 15 1409 of the stack store the contents of the K3 register.

Figure 15A:
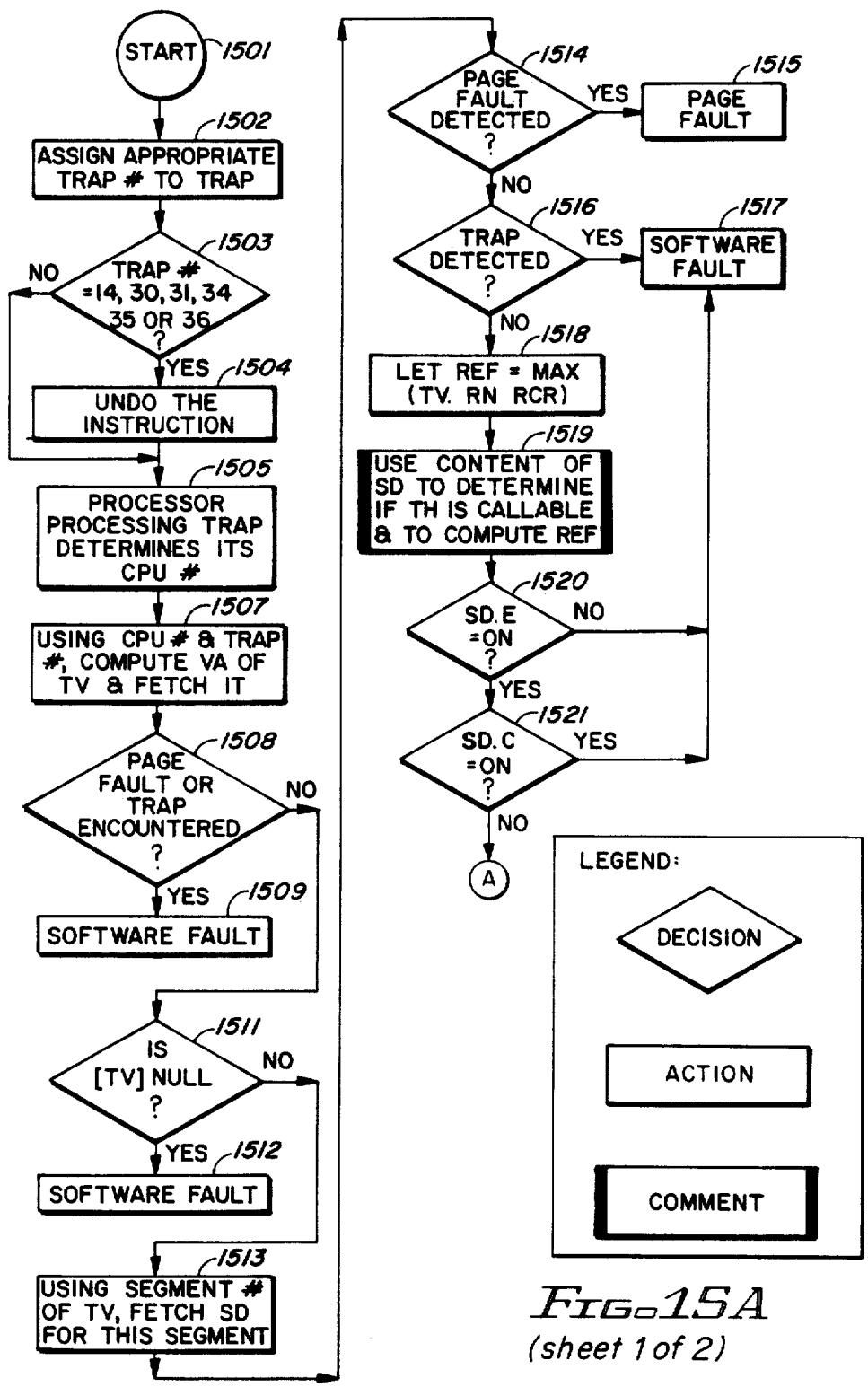
FIG. 15A is a flow chart of the steps initiating a trap procedure.
Figure 15A:
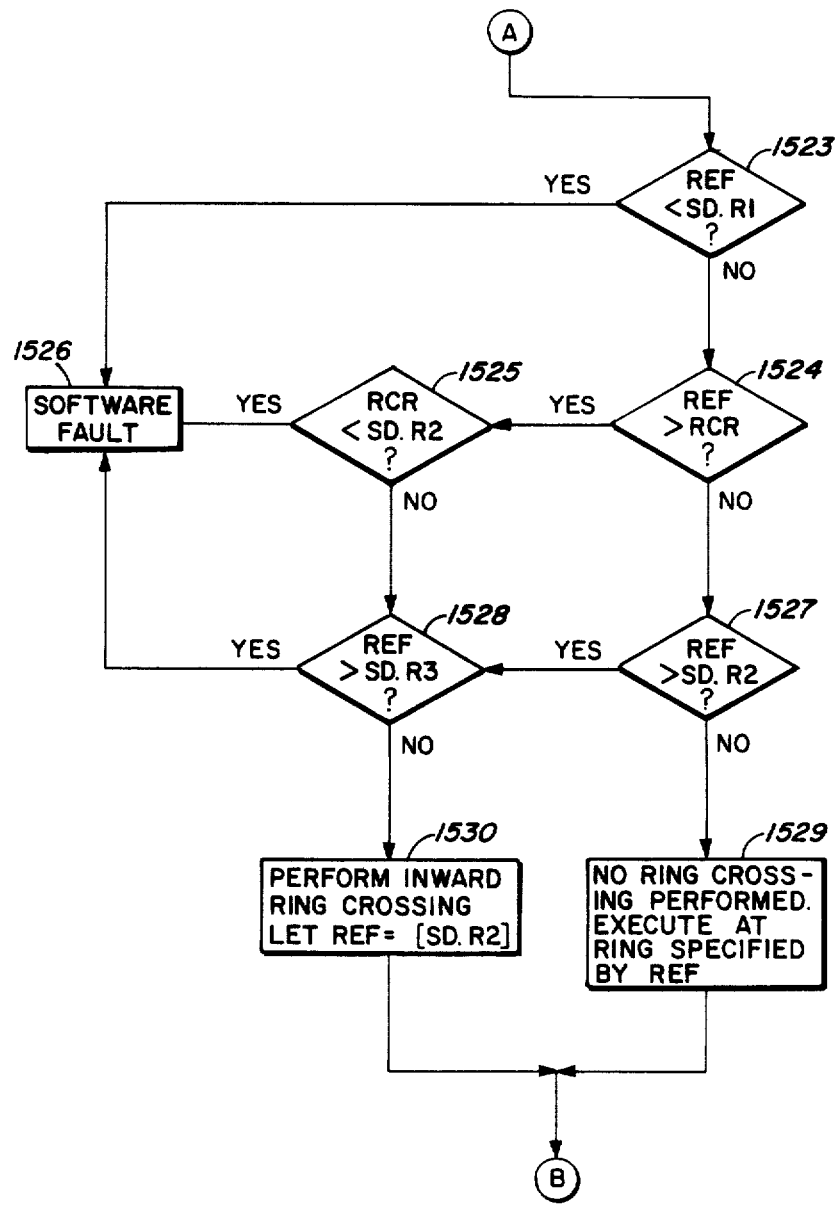
Figure 15B:
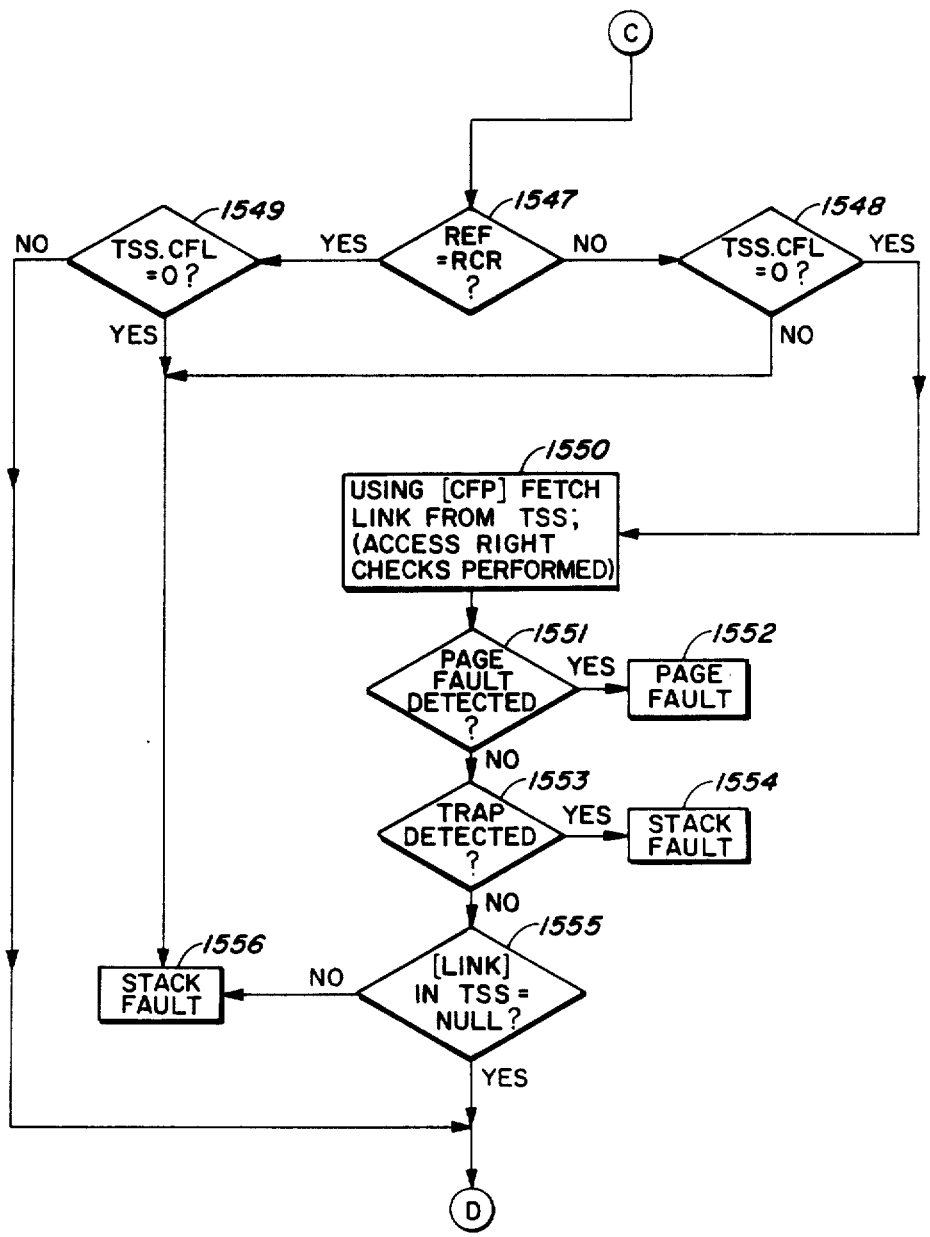
FIG. 15B is a flow chart of the steps continuing the trap procedure of FIG. 15A.
Figure 15C:
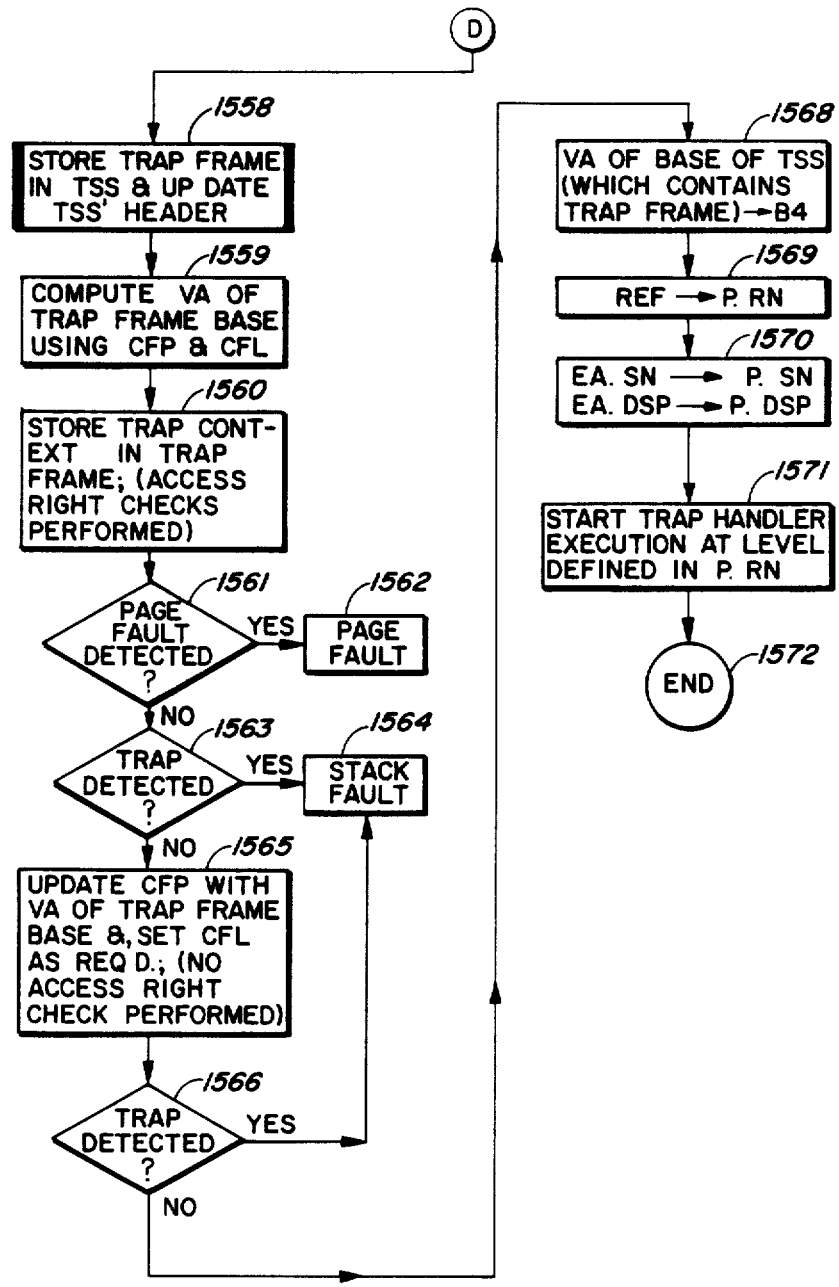
FIG. 15C is a flowchart of the steps concluding the trap procedure of FIG. 15B, according to the present invention.

Referring next to FIG. 15A–15C, the hardware functions for responding to a trap condition are illustrated. The hardware functions are similar to those invoked during the execution of a call instruction, the only difference being that in the case of a trap, the trap condition determines the called procedure (or trap handler) while in the case of a call instruction, the call instruction identifies the called procedure. Referring next to FIG. 15A, in step 1502, the appropriate trap number is assigned to the trap. In step 1503, the determination is made whether or not the trap number is one of a preselected group of trap numbers. When the trap number is one of those, then the hardware must undo the instruction in step 1504 so that the instruction may be retried once the trap condition is resolved. After step 1504 or when the trap number is not one of the predetermined trap numbers, the processor processing the trap determines its processor identifying number. In step 1507, the processor identifying number and the trap identifying number are used to compute the virtual address of the trap vector and the trap vector is retrieved. In step 1508, a determination is made as whether a page fault or a trap has been encountered. When true, then a software fault routine is entered. Otherwise, the trap procedure continues.

When the contents of the trap vector location are null in step 1511, then a software fault procedure is instituted. When the trap vector contents are not null, then in step 1513, the segment descriptor for this segment is retrieved using the segment number of the trap vector. A page fault and a trap are tested in steps 1514 and 1516. When a page fault or a trap is detected, then a page fault (step 1515) or a software fault procedure (1516) is initiated. Otherwise, the ring effective number is chosen to be the maximum (least privileged) of the trap vector ring number or the current privilege level, in step 1518. The next sequence of steps uses the segment descriptor of the segment containing the trap handler to determine whether the trap handler is callable and to compute the ring effective number (1519). In step 1520, the determination is made whether the trap handler is in an executable segment (E=1). When the result of this test is negative, the software fault procedure 1517 is invoked. Otherwise, the determination is made whether the trap handler segment descriptor has its compatibility bit on (C=1) in step 1521. When the test is positive, then the software fault procedure (1517) is invoked. When the test is negative, then trap processing continues.

The trap procedure determines whether or not a ring crossing occurs in steps 1523, 1524, and 1527 or whether no ring crossing occurs in steps 1523, 1524, 1525 and 1528. The determination is made whether the ring effective number is less than the R1 field of the segment descriptor in step 1523. When the determination is positive, then the software fault procedure (1526) is invoked. Otherwise, the the determination is made whether the ring effective number (REF) is greater than the original privilege in step 1524. When the ring effective number is greater than the original privilege, then the determination is made in step 1525 whether the R2 field of the segment descriptor is greater than original privilege. When the test is positive, then the software fault procedure 1526 is invoked. When the determination in step 1524 is negative, then the test is made in step 1527 whether the ring effective number is greater than the R2 field of the segment descriptor. When the determination in step 1525 is negative or the determination of step 1527 is positive, then the determination is made whether the ring effective number is greater than the R3 field of the segment descriptor. When the answer is positive, then the software fault procedure is invoked. Otherwise, in step 1530, an inward ring crossing is performed, letting the ring effective number equal the R2 field of the segment descriptor. When the determination of step 1527 is negative, then no ring crossing is performed, and the procedure is executed at the ring specified by the ring effective number.

Referring next to FIG. 15B, step 1532 indicates that the following steps of the procedure describe how a trap frame is acquired in the appropriate stack segment of the new stack, i.e. the per processor wired ring 0 stack segment or a non-wired stack segment. Step 1533 indicates that the following steps compute the link of the trap frame by reading the current frame pointer in the current stack segment. In step 1534, the virtual address of the current frame pointer in the current stack segment is computed using the level number, the current processor number and the original privilege and the current frame pointer is retrieved. In step 1535, the detection of whether a page fault has been detected is made and in step 1537, the determination of whether a trap has been detected is made. These determinations result in a page fault procedure (1536) or in a stack fault procedure (1538). Step 1539 indicates that the link of the trap frame = the content of the current frame pointer in the current stack segment.

FIG. 15B shows how to compute the virtual address of the target stack segment (the stack segment which will receive the trap frame) in order to be able to retrieve its current frame pointer and the current frame length as stated in step 1541. In step 1542, the virtual address of the base of the trap stack segment is computed using the privilege level number, the current processor number and the ring effective privilege. The first four words of the target stack segment (the current frame pointer and the current frame length) are retrieved. In step 1543, the presence of a page fault is determined, while in step 1545, the presence of a trap condition was determined. The presence of either condition results in a page fault procedure (1544) and a stack fault procedure (1546) respectively. Steps 1547 through 1555 are performed to check the integrity of the stack structure. In step 1547, the condition, the ring effective number equals current ring number, is tested. When the condition is true, i.e., REF = RCR, this indicates that the target stack segment is actually the current stack segment and therefore must contain at least one frame. Therefore, the condition that target stack segment current frame length value equals zero is tested. When the condition in step 1549 is true, i.e., the current frame length in the target stack segment header is equal 0, then a stack structure error exists and a stack fault procedure 1556 is initiated. Otherwise the trap procedure can continue. The condition REF = RCR is false indicates that the target stack segment is not the current stack segment and thus does not contain a frame, so when the condition TSS.CFL = 0 of step 1548 is false, then a stack structure error exists and a fault procedure 1556 is initiated. Otherwise, the trap process can continue and the link from the target stack segment is fetched using the current frame pointer in the target stack segment header in step 1550. The test for a page fault and a trap condition are made in steps 1551 and 1553. In step 1555, the condition does the link in target stack segment equal null is tested. When the test in step 1555 is negative, then the stack fault procedure is initiated, otherwise the trap procedure continues.

Referring next to FIG. 15C, step 1558 indicates that the trap frame is to be stored in the target stack segment and that the header of the target stack segment is to be updated. In step 1559, the virtual address of the trap frame base is calculated using the current frame pointer and the current frame length. The trap context is stored in the trap frame (and access right checks are performed). In step 1561, the presence of a page fault is determined and in step 1563, the presence of a trap condition is tested. In step 1565, the current frame pointer is updated with the virtual address of the trap frame base and the current frame length is set as required. In step 1566, the presence of a trap condition was tested.

The virtual address of the base of the target segment stack (which contains the trap frame is entered in base address register B4 (and the ring number of B4 is set to the effective ring number REF) in step 1568, in step 1569, the R effective is placed in the ring field of the procedure pointer register P.RN. Referring to step 1570, the effective address EA (EA.SN and EA.DSP) is loaded into the procedure pointer register P. In step 1571, the trap handler execution is started at the level defined in P.RN.

Having shown and described a preferred embodiment of the invention, those skilled in the art will realize that many variations of modifications can be made to produce the described invention and still be within the spirit and scope of the claimed invention.

What is claimed is:

1. In a data processing system having a ring architecture comprised of a plurality of protection rings, each of said protection rings determining a level of privilege for execution of procedures (including programs) related to each of said protection rings, each procedure having a ring number associated therewith identifying a level of protection, wherein procedures can execute at a level of privilege of said procedure ring number or a lower privilege level, each procedure having attributes associated therewith defining execution restrictions thereof, a method for causing a first procedure executing at a first level of privilege to utilize a second procedure which is executed at a higher level of privilege, said method comprising steps of:

comparing attributes of said first and said second procedure to determine when a predetermined relationship exists between said first and said second procedure attributes by means of a test procedure executed by said data processing system under hardware control without intervention of a software procedure;

providing a stack means associated with each level of privilege for storing information related to procedures being executed at an equivalent level of privilege, wherein a stack means associated with a highest level of privilege is implemented by dedicated memory locations in a main memory unit of said data processing unit;

when said predetermined relationship exits between said first and said second procedure attributes, entering control information in a second stack means associated with said second procedure under data processing system hardware control;

when, required by said second-procedure, entering data information in said second stack means under data processing system software control;

entering address information identifying a location of control information in a first stack means associated with said first procedure; executing said second procedure, said second procedure using control information from said second stack means; and, after completion of said second procedure, returning to execution of said first procedure by means of a procedure activated in response to said second procedure completion and executed under data processing system hardware control.

2. The method for changing currently executing procedures in a data processing system of claim 1 further comprising a step of responding to a condition in said first procedure requesting said second procedure, said responding step causing said comparing step to be executed.

3. The method for changing currently executing procedures in a data processing system of claim 2 wherein said responding to a condition step further includes the step of responding to a trap condition and responding to a call instruction.

4. The method of changing currently executing procedures in a data processing system of claim 1 further comprising a step of including in a first field in said second stack means containing a location of said second procedure information in said second stack means.

5. The method of changing currently executing procedures in a data processing system of claim 1 further comprising a step of causing said second procedure operating at said second level of privilege to utilize a third procedure which is executed at higher level of privilege than said second level of privilege.

* * * * *